US007725406B2

(12) United States Patent
Black et al.

(10) Patent No.: US 7,725,406 B2
(45) Date of Patent: May 25, 2010

(54) SYSTEMS AND METHODS FOR INTERNATIONAL SHIPPING AND BROKERAGE OPERATIONS SUPPORT PROCESSING

(75) Inventors: Dale Black, Louisville, KY (US); Gary Clements, Louisville, KY (US)

(73) Assignee: United Parcel Service of America, Inc., Atlanta, GA (US)

( * ) Notice: Subject to any disclaimer, the term of this patent is extended or adjusted under 35 U.S.C. 154(b) by 1591 days.

(21) Appl. No.: 10/814,958

(22) Filed: Mar. 30, 2004

(65) Prior Publication Data
US 2005/0222853 A1  Oct. 6, 2005

(51) Int. Cl.
G06Q 10/00 (2006.01)
G06F 17/00 (2006.01)

(52) U.S. Cl. .................. 705/331; 705/400
(58) Field of Classification Search .......... 705/1, 705/400
See application file for complete search history.

(56) References Cited

U.S. PATENT DOCUMENTS

| | | | |
|---|---|---|---|
| 4,949,272 A | 8/1990 | Vanourek et al. | |
| 5,063,506 A | 11/1991 | Brockwell et al. | |
| 5,117,364 A | 5/1992 | Barns-Slavin et al. | |
| 5,337,246 A | 8/1994 | Carroll et al. | |
| 5,448,641 A | 9/1995 | Pintsov et al. | |
| 5,485,369 A | 1/1996 | Nicholls et al. | |
| 5,557,518 A | 9/1996 | Rosen | |
| 5,661,653 A | 8/1997 | Kulik | |
| 5,721,832 A | 2/1998 | Westrope et al. | |
| 5,745,886 A | 4/1998 | Rosen | |
| 5,758,328 A | 5/1998 | Giovannoli | |
| 5,774,553 A | 6/1998 | Rosen | |
| 5,787,402 A | 7/1998 | Potter et al. | |
| 5,799,151 A | 8/1998 | Hoffer | |
| 5,878,139 A | 3/1999 | Rosen | |
| 5,878,400 A | 3/1999 | Carter, III | |
| 5,897,621 A | 4/1999 | Boesch et al. | |

(Continued)

FOREIGN PATENT DOCUMENTS

GB  2331384  5/1999

(Continued)

OTHER PUBLICATIONS

Stedman, Craig, "E-tailers eye overseas dollars", 1999, ComputerWorld.*
International Search Report from PCT/US2005/07559, dated Jun. 27, 2006.
XPORTA, About Xporta, Retrieved Dec. 29, 2000 from Internet Site http://xporta.com/about/index.html, p. 1 of 1.
XPORTA, Solutions, Retrieved Dec. 29, 2000 from Internet Site http://xporta.com/solutions/index.html, p. 1 of 1.

(Continued)

Primary Examiner—John W Hayes
Assistant Examiner—Fadey S Jabr
(74) Attorney, Agent, or Firm—Alston & Bird LLP

(57) ABSTRACT

Systems and methods are disclosed for a brokerage operations support system to facilitate international shipping of goods into a country. The system receives information pertaining to a shipment and rates the shipment for a specific country by applying rules defined for the country's customs regulations. Status information of the shipment is received by the system, including whether the shipment has cleared the importing country's customs process. If the shipment has not cleared, the handling systems ensure the shipment is withheld from delivery until clearance is obtained. A flexible system architecture comprising a server and both attended and unattended workstations for a core system that can be modified to allow rating and processing of shipments occur in various modes to accommodate the procedures for each importing country.

4 Claims, 13 Drawing Sheets

U.S. PATENT DOCUMENTS

| | | | |
|---|---|---|---|
| 6,012,065 | A | 1/2000 | Boucher et al. |
| 6,018,725 | A | 1/2000 | Boucher et al. |
| 6,061,667 | A | 5/2000 | Danford-Klein et al. |
| 6,065,673 | A | 5/2000 | Kokkila |
| 6,169,977 | B1 | 1/2001 | Hasbani et al. |
| 6,286,009 | B1 | 9/2001 | Mattioli, Jr. et al. |
| 6,460,020 | B1 * | 10/2002 | Pool et al. .................. 705/26 |
| 7,319,990 | B1 * | 1/2008 | Henty ...................... 705/400 |
| 7,406,472 | B2 * | 7/2008 | Manucha et al. ............ 707/10 |
| 7,464,054 | B2 * | 12/2008 | Chin et al. .................. 705/37 |
| 7,596,500 | B1 * | 9/2009 | Thompson et al. ........... 705/1 |
| 2002/0010665 | A1 * | 1/2002 | Lefebvre et al. ............. 705/31 |
| 2002/0046191 | A1 * | 4/2002 | Joao ......................... 705/400 |
| 2002/0049622 | A1 | 4/2002 | Lettich et al. |
| 2002/0116273 | A1 * | 8/2002 | Sundel ....................... 705/19 |
| 2003/0041068 | A1 * | 2/2003 | Camarillo ................. 707/100 |
| 2003/0105704 | A1 * | 6/2003 | Sundel ....................... 705/37 |
| 2003/0191724 | A1 * | 10/2003 | Turra et al. ................ 705/400 |
| 2003/0236688 | A1 | 12/2003 | Kadaba et al. |
| 2004/0015392 | A1 * | 1/2004 | Hammel et al. .............. 705/13 |
| 2004/0024739 | A1 | 2/2004 | Copperman et al. |
| 2005/0033592 | A1 * | 2/2005 | Uy et al. ...................... 705/1 |
| 2005/0119926 | A1 * | 6/2005 | Turetsky et al. ............... 705/8 |
| 2005/0222853 | A1 | 10/2005 | Black et al. |
| 2006/0148446 | A1 * | 7/2006 | Karlsson ................... 455/406 |
| 2007/0073551 | A1 * | 3/2007 | Williams et al. .............. 705/1 |
| 2007/0299686 | A1 * | 12/2007 | Hu et al. ...................... 705/1 |
| 2008/0097933 | A1 * | 4/2008 | Awaida et al. ............. 705/400 |
| 2009/0089125 | A1 * | 4/2009 | Sultan ......................... 705/7 |

FOREIGN PATENT DOCUMENTS

| | | |
|---|---|---|
| GB | 2331601 | 5/1999 |
| GB | 2331602 | 5/1999 |
| JP | 2009048594 A * | 3/2009 |
| WO | WO 00/29995 | 5/2000 |
| WO | WO 00/70519 | 11/2000 |
| WO | WO 0124096 A1 * | 4/2001 |
| WO | WO 03/030056 A2 | 4/2003 |

OTHER PUBLICATIONS

XPORTA, Xporta Products, Retrieved Dec. 29, 2000 from Internet Site http://xporta.com/solutions/products.html, p. 1 of 1.

Network Computing, International E-Commerce, Retrieved Jun. 6, 2002 from Internet Site http://www.networkcomputing.com/1023/1023f24.html, pp. 1-2.

Network Computing, Governing Who Goes Global, Retrieved Jun. 6, 2002 from Internet Site http://www.networkcomputing.com/1023/1023f23.html, pp. 1-2.

ComputerWorld, Shippers Try Software To Tally Foreign Tariffs, Retrieved Jun. 6, 2002 from Internet Site http://www.computerworld.com/news/1999/story/0,11280,37919,00.html, pp. 1-3.

SupplyChainBrain.Com, The Level of Detail Determines Accuracy in Computing Landed Cost, Retrieved Jun. 6, 2002 from Internet Site http://www.supplychainbrain.com/archives/4.01.opinion.htm?adcode=30, pp. 1-4.

SupplyChainBrain.Com, The Supply Chain e-Business Top 100 Plan: Supply-Chain Planning Builds on its Success, Retrieved Jun. 6, 2002 from Internet Site http://www.glscs.com/archives/6.01_Plan100.htm?adcode=80, pp. 1-4.

MSI, International Efficiencies—Trade logistics software increases supply chain visibility, aids sourcing across national boundaries, Retrieved Jun. 6, 2002 from Internet Site http://www.manufacturingsystems.com/newsletter/012802/sb0128.asp, pp. 1-3.

Arzoon Life Solutions, Total Landed Cost Calculator, Retrieved Jun. 6, 2002 from Internet Site http://www.arzoon.com/als_TotalLandedCostCalculator.html, pp. 1-2.

Genesis Solutions, Supply Chain Network Optimization, Retrieved from Internet Site www.genesissolutions.com, pp. 1-8.

WIDESOFT, Widesoft B2B Solutions, Retrieved Jun. 6, 2002 from Internet Site http://www.widesoft.com.br/site/english/, pp. 1-4.

WorldWide Retail Exchange, WorldWide Trade Logistics—Benefits to Retailers and Suppliers, Retrieved Jun. 6, 2002 from Internet Site http://www.worldwideretailexchange.org/cs/en_US/exchange/wr3600.html, pp. 1-2.

Access Its, News—Syntra Technologies Launches Global Commerce Management Initiative, Retrieved Jun. 6, 2002 from Internet Site http://www.itsa/org/ITSNEWS.NSF/4e0650bef6193b.../cc8903ba4a39f97852567da00407b7d?OpenDocument, pp. 1-4.

Nextlinx, Supplylinks Chooses NextLinx to Extend Global Transportation Solution, Retrieved Jun. 6, 2002 from Internet Site http://www.nextlinx.com/prs_re13_20.html, pp. 1-3.

Qiva, Qiva rolls Out Integrated Product Strategy; Launches New Web Site and Corporate Identity, Retrieved Jun. 6, 2002 from Internet Site http://www.qiva.com/news/prbrand711.html, pp. 1-2.

Tradepaq, Logistics Execution for Global Trade, Journal, Copyright 1999-2002, pp. 1-2, Tradepaq Corporation, New York, NY.

Business Wire, Fritz Offers Faster Duty and Tax Information to Clients; Takes Orders for New Proprietary Trade Cost Model, Feb. 10, 1999, pp. 115-118.

Coia, Anthony, International Efficiencies: Trade Logistics Software Increases . . . , MSI, Apr. 2002, p. 20, vol. 20, No. 4, TradeSphere Importer.

Computergram International, GE Information Services Launches Cargo*Link EDI Service for Shippers, Mar. 2, 1990, Issue No. 0268-716X, Computergram International.

Sweat, Jeff, (WINESMART.COM), Inc. Ship It, Journal , Jan. 22, 2001, Issue No. 8750-6874, Information Week.

Wheatman, Victor S., Just Getting Started: Worldwide Traders Testing EDI Maintain Their Motivation Despite Complexities and Obstacles. (electronic data interchange), Mar. 15, 1988, Issue No. 0897-8085, vol. 8, No. 4, p. 52, Software Magazine.

Chabrow, Eric, Supply Chains Go Global—The Internet Levels the Geographic Playing Field and Lets Companies Reach Into the Farthest Corners of the Planet For Partners and Customers, Apr. 3, 2000, Issue No. 8750-6874, InformationWeek.

Newsbytes, HK Trade and Transport EDI Launch Set for Jul., Mar. 20, 1995, Newsbytes.

Shand, Dawne, All Information is Local; IT Systems Can Connect Every Corner of the Globe, But IT Managers are Learning They Have to Pay Attention to Regional Differences, Apr. 10, 2000, Issue No. 0010-4841, Computerworld.

Internetweek NA, Homeland Security Rules Heighten Need for Supply-Chain Automation; As U.S. Customs Plans Stiffer Enforcement of Rules Governing Shipments to the Nation's Ports, U.S. Shippers Conducting International Business Will Likely be Required to Implement More Automated Supply-Chain Event Management and Transportation Management Systems, May 1, 2003, Issue No. 1096-9969, Internetweek.

Logistics Execution for Global Trade, *Tradepaq for Logistics*, 2 pages, 1999-2000 Tradepaq Corporation.

Syntra Technologies Launches Global Commerce Management Initiatives, *ITS America*, pp. 1-4, last updated Aug. 27, 1999, http://itsorg/ITSNEWS>NSF/4e0650bef6193B.../cc83903ba39f97852567da00407b7d?OpenDocument.

Supplylinks Chooses NextLinx to Extend Global Transporation Solution, Nextlinx, pp. 1-3, Jan. 18, 2001.

"Qiva Rolls Out Integrated Product Strategy; Launches New Web Site and Corporate Identity," *QIVA*, Jul. 11, 2001, http://www.qiva.com/news.prbrand711.html.

"From2.com Forms Strategic Alliance with Subasta.com," *PR Newswire*, Jul. 12, 1999.

Xporta redefines Landed Cost with its Introduction of the First Real-Time Solution for Domestic and International Shipments of all Commodities; Xporta Launches the Landmark Web-Based Decision-Support Solution that Enables Buyers, Suppliers, and e-Marketplace to quote Universal Landed Cost, *PR Newswire*, Sep. 27, 2000.

Hudgins, "Get the Lowdown on the Toughest Obstacles to Going Global, from Calculating Shipping, taxes and other Charges, to Showing Process in Local Currencies," *Network Computing*, Nov. 15, 1999, pp. 75-92.

* cited by examiner

Exemplary Rating Profiles

SYSTEMS AND METHODS FOR INTERNATIONAL SHIPPING AND BROKERAGE OPERATIONS SUPPORT PROCESSING

FIELD OF THE INVENTION

This invention is directed to computer systems supporting international customshouse brokerage and shipping functions. Specifically, the invention pertains to a customshouse brokerage operation support system that can be locally programmed to facilitate importation of goods including functions for rating shipments, requesting customs clearance, and coordinating shipment processing systems.

BACKGROUND OF THE INVENTION

Trade globalization and modern manufacturing processes result in many businesses involved in an international supply chain of goods. A given manufacturer frequently obtains assembly components from suppliers located in various countries and each of the suppliers, in turn, may obtain subcomponents from suppliers in other countries, and so on. It is the norm that products may have subcomponents made in various countries. Coupled with the prevalence of 'just-in-time' inventory management, timely international shipping of parts is a critical aspect of maintaining orderly and efficient supply chain management. Facilitating importation of such shipments is critical to modern manufacturing processes and providing an efficient global trade economy.

However, importing goods of a shipment is a complicated process involving many regulations that vary from country to country. For example, many countries restrict the type of goods that can be imported under the auspices of international trade agreements or unilateral regulation by the importing country. Special permits may be required for importing particular goods to a particular consignee. Finally, each country has different documentation requirements that must be met and these typically based on the type of good being imported (e.g., machine products, textiles, agricultural goods). To facilitate processing, most countries have adopted an international goods classification scheme for categorizing goods. The scheme provides a classification number along with a description of the goods. The importing country assigns a duty rate based on the classification of the goods. Thus, the duty rate in conjunction with the value of the goods (and other factors) allows calculation of the duties and taxes to be paid to customs for the imported goods.

Although a basic business function, determining the cost of importing goods (i.e., costs other than the purchase prices of the goods) is a complicated process. Obtaining an accurate cost of importing goods has been, and still is, a difficult endeavor, frequently filled with estimates. Because ascertaining an accurate cost prior to shipping is so difficult, initial estimates are often used and the final cost is 'trued up' after the goods are imported and the actual cost of importation is determined afterwards.

The cost of importing goods is often referred to as the 'landed cost' of a shipment. This involves the total cost of delivering the goods from origination (shipper) to destination (consignee) and comprises transportation (shipping) costs and various duties and taxes. The transportation costs are associated with transferring, loading, and unloading the goods along the route (frequently involving costs associated with air or marine transportation, portage, short term storage, transfers, local shipping, etc.). The other major components of landed cost are the regulatory costs of duties and taxes that are dependent on the destination country. These costs may include various value added taxes (VAT), import duties, custom (tariff) charges, and surcharges assessed based on the type and value of good. For example, a raw product and a processed product of the same basic material (e.g., spooled wool fiber versus woven wool fabric) are taxed and tariffed differently. Alternatively, a single consumer product, such as a wrist watch, may be tariffed and taxed as multiple commodity items, e.g., a watch band, watch works, and watch case. As expected, taxes for a jeweled, gold-metal watch case are less than taxes for a plain, steel-metal watch case.

It is readily evident that consistent assessment of tariffs and duties requires a well-defined international goods classification scheme. That is the purpose of the Harmonized System of Goods. Manufacturers, transporters, exporters, importers, customs officials, statisticians, and others use the system for classifying goods for international trade under a single commodity code. The system contains approximately 5,000 headings and subheadings of goods, generally organized by industry segments. While the scheme is international in nature and authority, the treatment for goods of a given classification is national in nature and varies by each importing country. Some countries may define sublevels of classifications. Determining the duties and tariffs associated with a shipment (a process called 'rating') requires knowledge of not only the importing country's regulatory requirements, but the rules of how that country applies the international classification system.

Once the shipment has been rated (and assuming none of the items are restricted from importation), the required duties and tariffs must be paid to the appropriate governmental agencies, typically the Customs Office. Information for each good being imported must be detailed to the Customs Office in a document called a Declaration. The creation of the Declaration can be divided into two activities. In the first activity, the carrier typically communicates information regarding the shipment to a broker. The information includes description of the items, values, quantities, shipper, etc. In many instances, the carrier obtains this information from the shipper when the shipment originates. The second activity involves the broker classifying each of the items in the shipment that generates the amount due for the duties and taxes. Once completed, the Declaration can be communicated to the Customs Office by either party along with the amount due. Once the amount due is collected by the Customs Office and has reviewed the Declaration, the Customs Office issues a "customs clearance" to the carrier indicating that delivery to the consignee may proceed. Usually, if goods have arrived at that importing port or terminal, the imported goods are temporarily stored until clearance is obtained, and then local delivery of the goods continues. To minimize storage costs and delays, it is desirable to provide accurate and complete information to the Customs Office to facilitate a timely clearance response for a shipment.

Rating is based on a "Declaration" indicating the goods shipped. The Declaration includes, among other information, the quantity of items, their description, part number, and value. The items may be further decomposed into 'commodities' correlating with internationally recognized commodities for customs processing and which are identified by tariff codes. For example, an imported wristwatch may be listed as commodities comprising a watchband, case, and watch mechanism. The Declaration provided by the originator may detail the commodities and associated tariff codes, and if provided, this simplifies customs processing. Frequently, the item description provided by the shipper does not directly comport to an international commodity description, or if it does, no tariff codes are provided. This significantly complicates rating as the carrier or customs broker must determine the appropriate commodities and tariff codes for the identified goods.

Often, a shipper exports the same type of goods to a given importer over time. The absence of a tariff code on the initial shipment may often necessitate research and determination of the tariff code by the carrier or customs broker. However on subsequent shipments, once the carrier has determined the tariff code, it would be preferable for the carrier to utilize previously obtained knowledge of tariff codes to quickly determine the tariff code on subsequent shipments.

It is well recognized that computer systems are well adapted for handling complex logistics operations. For the carrier(s) shipping the goods, the myriad regulations, which also vary from country to country, present a complicated logistics operation that could benefit from the application of computer systems. Specialized brokerage agents exist in various countries to facilitate importation of goods and these agents may use computerized systems to assist them. However, each of these systems typically is developed for the specific importing country.

For example, U.S. Pat. No. 6,460,020, Universal Shopping Center for International Operation, discloses an integrated system that allows the selection and purchase of goods internationally and computes the associated taxes and fees given the commodity code of the goods being shipped, but it does not disclose a system facilitating brokerage operations independent of the purchase of the goods. Nor does it disclose how the integrated system is adapted to interact with each of the different countries' regulations or how the Custom's clearance status impacts handling shipments at the point of entry.

Similarly, the prior art disclosed in PCT Application WO 00/70519, titled Network Accessible Quotation and Shipping System, based on U.S. Patent Application 60/134,593; Ser. Nos. 09/464,543; and 09/464,537, discloses using the tariff code to calculate duties and taxes, but does not disclose how the system is adapted to interact with each of the country's Customs Offices nor how the customs clearance status affects the shipper's processing of the shipment or package.

The aforementioned systems determine duties and taxes based on knowledge of the tariff code, which in turn point to the appropriate databases. However, complete and accurate tariff codes for all items in a shipment are not always provided to a carrier. Frequently, an originator provides only a description and part number of the goods shipped. The part number has no global significance, and the description may not comport with internationally recognized goods descriptions. Since the carrier may be responsible for navigating the maze of regulatory requirements and determining the taxes, duties, and fees, the carrier has a need to readily determine the appropriate tariff code for the commodities being shipped.

Thus, there is a need for a system performing brokerage operations for international shipments that accommodates shipments, where the originator provides less than complete tariff codes identifying the goods. While such a system for a single importing country could be implemented on a single, large scale computer system, this system would have to be scalable to accommodate additional countries, or such as system would have to be replicated for each importing country. For example, a system designed to manage a carrier's shipments between the United States and Canada would not necessarily have the capacity to manage a carrier's shipments also involving the United States and Germany. Such a computer system would be required to maintain the rules and associated data (comprising rates, fees, duties, etc.) for each importing country. It is obvious that every time a country's regulations change (e.g., new rules or altering duties, etc.), the system would have to be modified to reflect those changes. Depending on the regulatory changes and how a brokerage computer system is structured, the regulatory changes could require altering existing data values or altering procedures for processing a shipment. Consequently, there is a need for a flexible, efficient, and scaleable computing system to facilitate management of international trade to provide rating and clearance status information.

BRIEF SUMMARY OF THE INVENTION

These and other objects and advantages are met by the present invention that includes a system using data of past shipments involving certain commodities between exporters and importers to facilitate determination of duties, fees, and taxes for current shipments involving the same types of goods concerning one or both of the same parties.

One aspect of the present invention is a system that automatically obtains customs clearance and communicates this information to systems processing the shipments thereby minimizing delays and storage of goods.

Another aspect of the present invention pertains to systems and methods for a brokerage operation support system ('brokerage system') to facilitate rating of shipment data wherein the shipment data may not exactly match rating data. The system processes shipment data by comparing each item with a rating profile stored in memory. The rating profile can be statically or dynamically created. The system compares the shipment data with the rating data to determine a confidence level of the match. In one embodiment, the system may request user assistance to select the proper rating profile as determined in part by the confidence level. In another embodiment, the system may rate the entire shipment and then determine whether the shipment as a whole meets a threshold confidence level.

Another aspect of the present invention pertains to systems and methods for a brokerage system interfacing with a customs clearance processing system to provide an electronic declarations document to the customs clearance processing system and receive a customs clearance status indication in response. The brokerage system may communicate the status indication to various other systems, including a package handing system and carrier billing systems.

Another aspect of the present invention pertains to systems and methods for a brokerage system interfacing with a package handling system to provide an indication of a customs clearance status indication. The package handling system may be embodied as an optical scanning system that identifies packages as they are processed in the port of entry and can query a database containing an indication of the customs clearance status.

Existing systems described in the prior art do not disclose a modular architecture designed to be adapted for each country's rules and regulations. Thus, another aspect of the present invention pertains to systems and methods for a rules-based brokerage system that processes data based on select rules from a library of rules. By using selected rules, the operation of the brokerage system can be adapted as required for various countries, which have different brokerage processing requirements. The processing procedures can be customized without redevelopment of the brokerage system.

BRIEF DESCRIPTION OF THE SEVERAL VIEWS OF THE DRAWINGS

Figure 1:
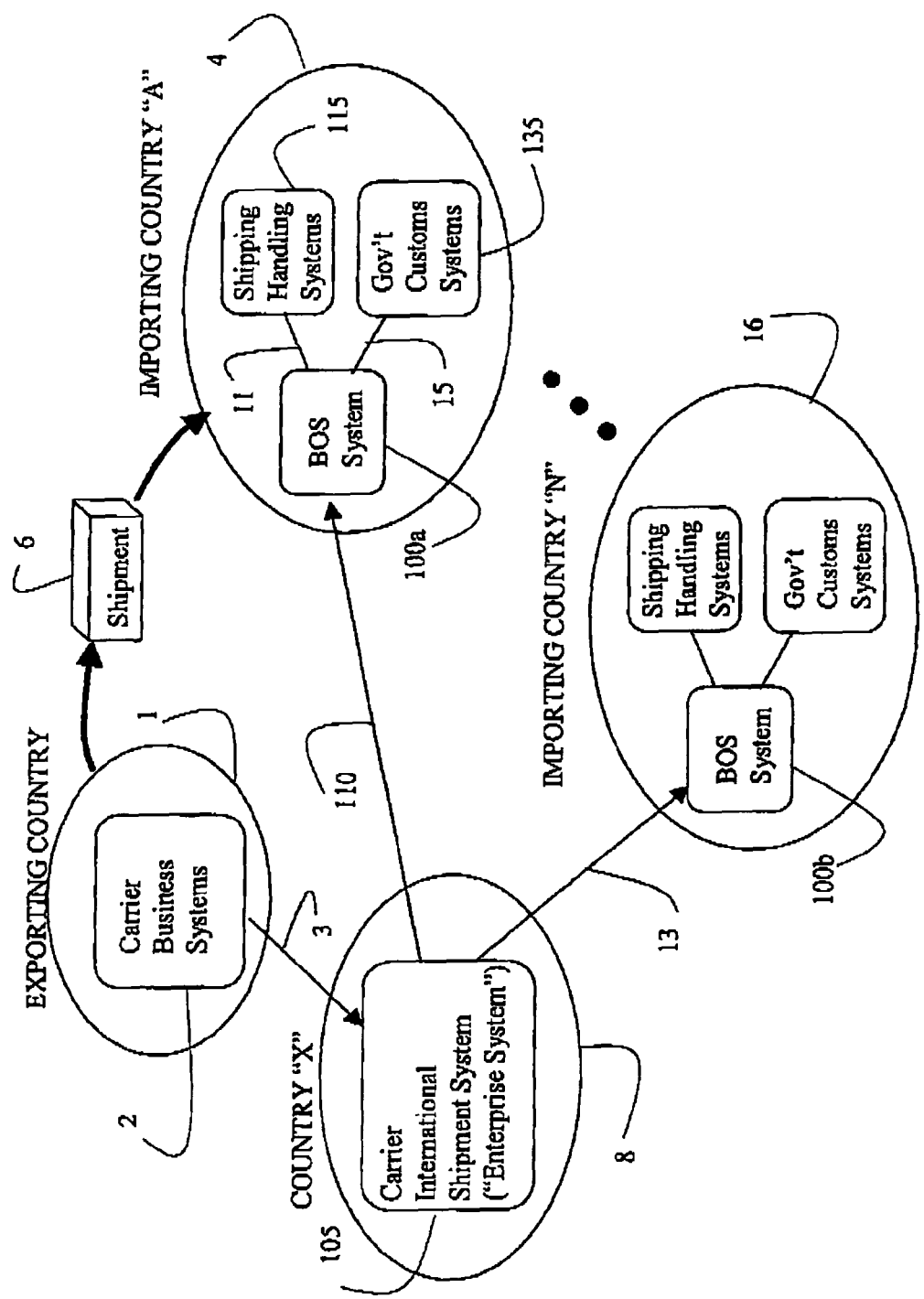

Having thus described the invention in general terms, reference will now be made to the accompanying drawings, which are not necessarily drawn to scale, and wherein:

FIG. 1 illustrates one embodiment of an overview of the relationship of the Brokerage Operation Support System and other systems deployed for processing an international shipment according to the principles of the present invention.

Figure 2:
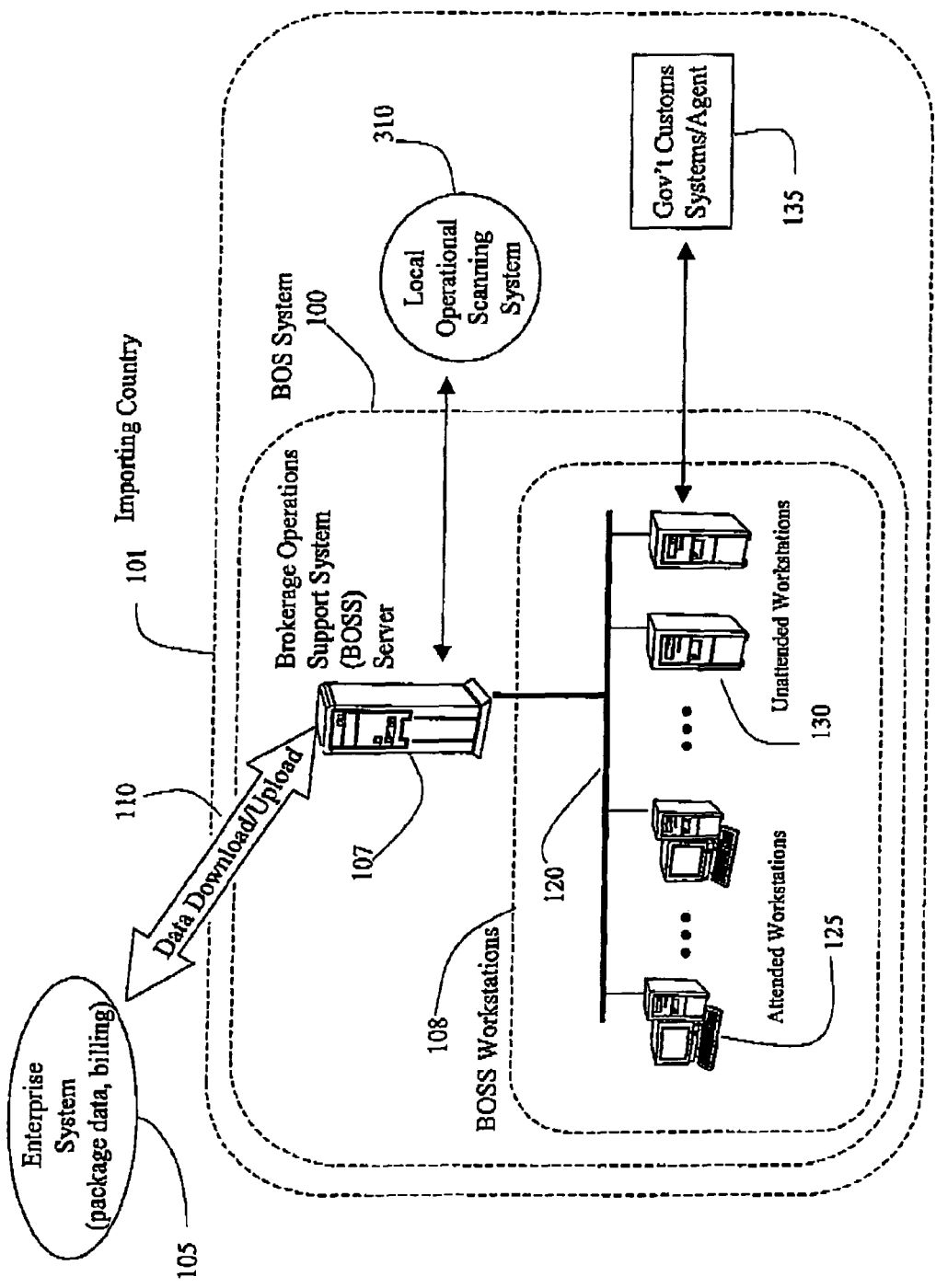

FIG. 2 illustrates one embodiment of the Brokerage Operation Support System in further detail and its interaction with other systems according to the principles of the present invention.

Figure 3:
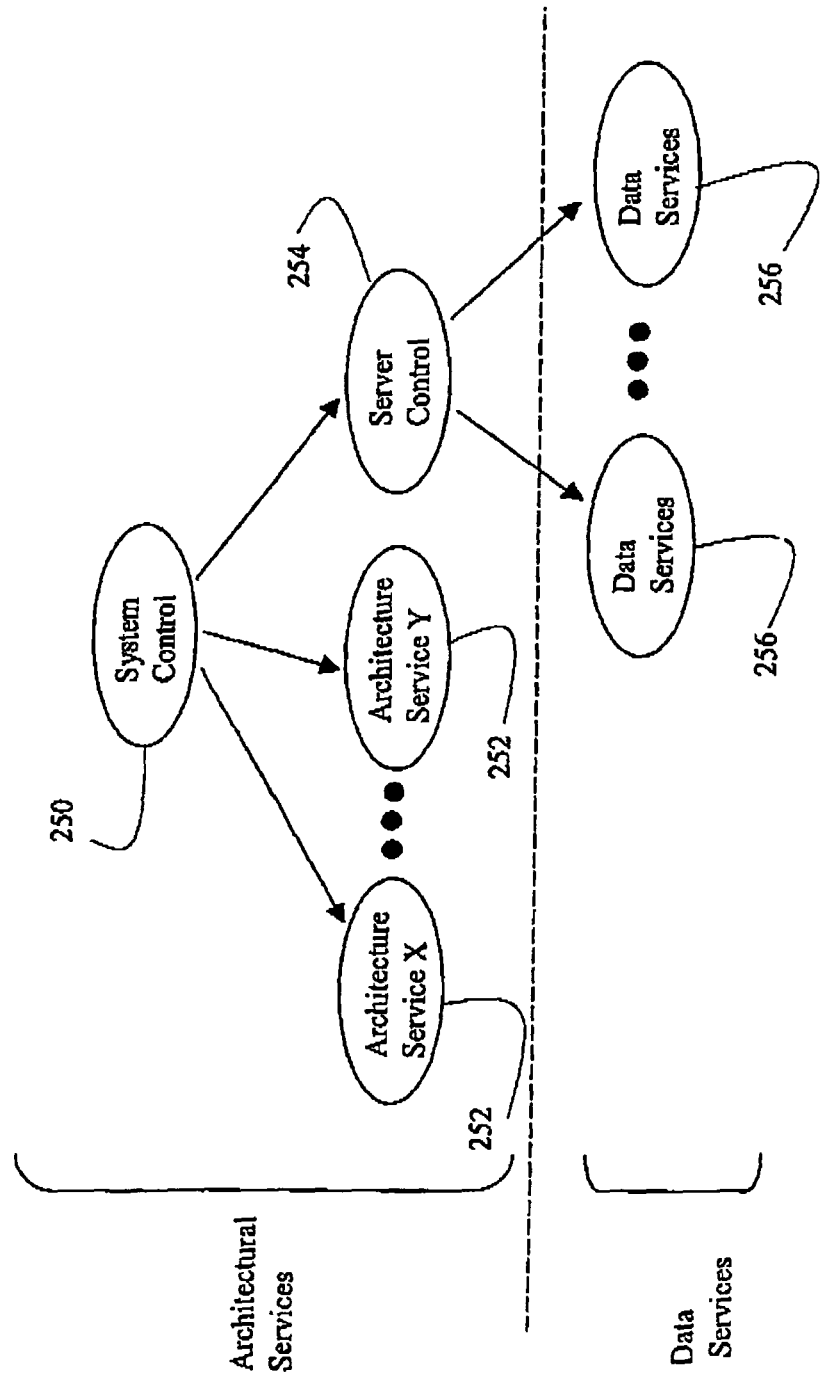

FIG. 3 illustrates one embodiment of the software architecture of the Brokerage Operation Support System Server according to the principles of the present invention.

Figure 4:
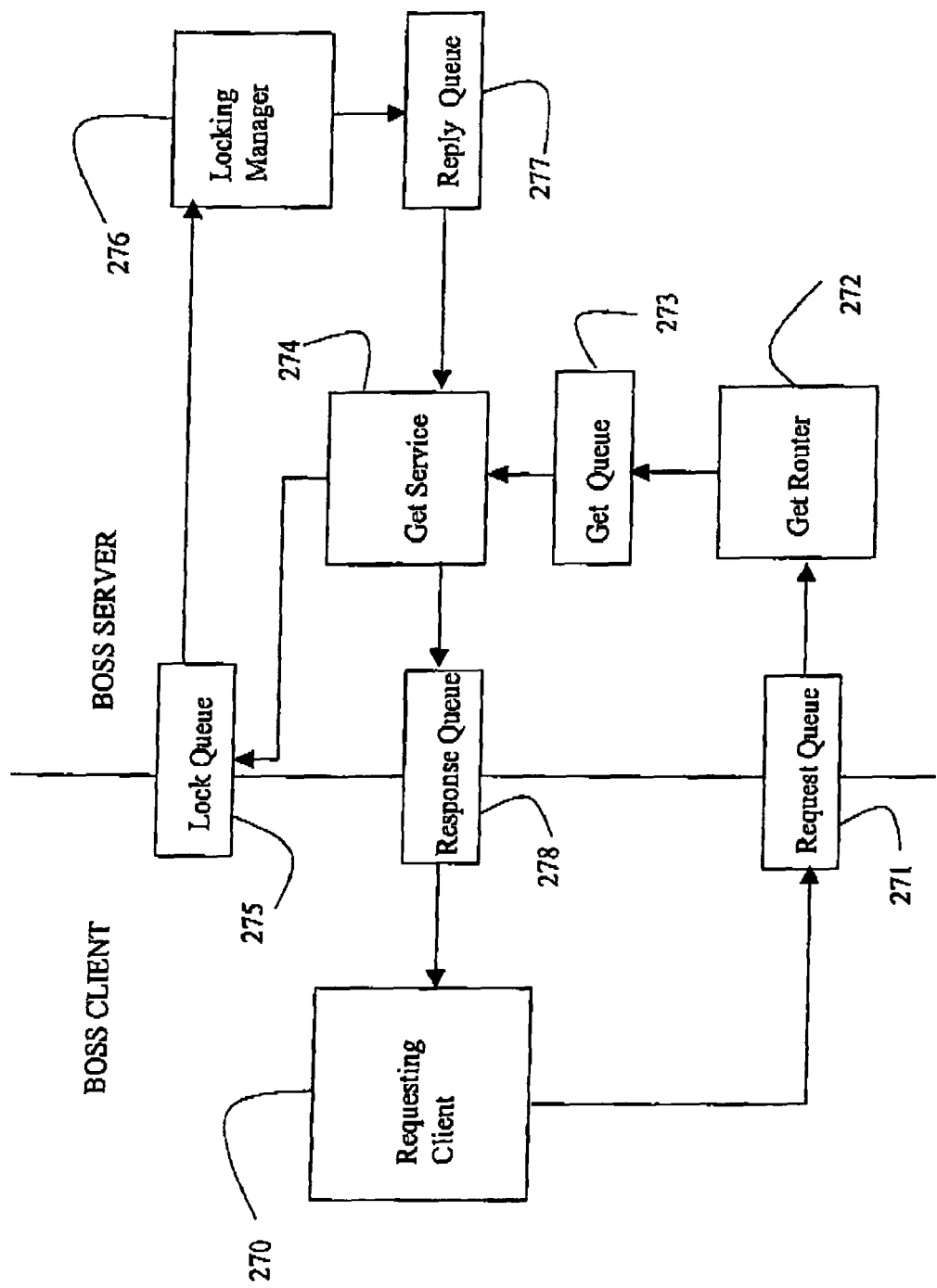

FIG. 4 illustrates one embodiment of the Get Service architectural service in the Brokerage Operations Support System Server according to the principles of the present invention.

Figure 5:
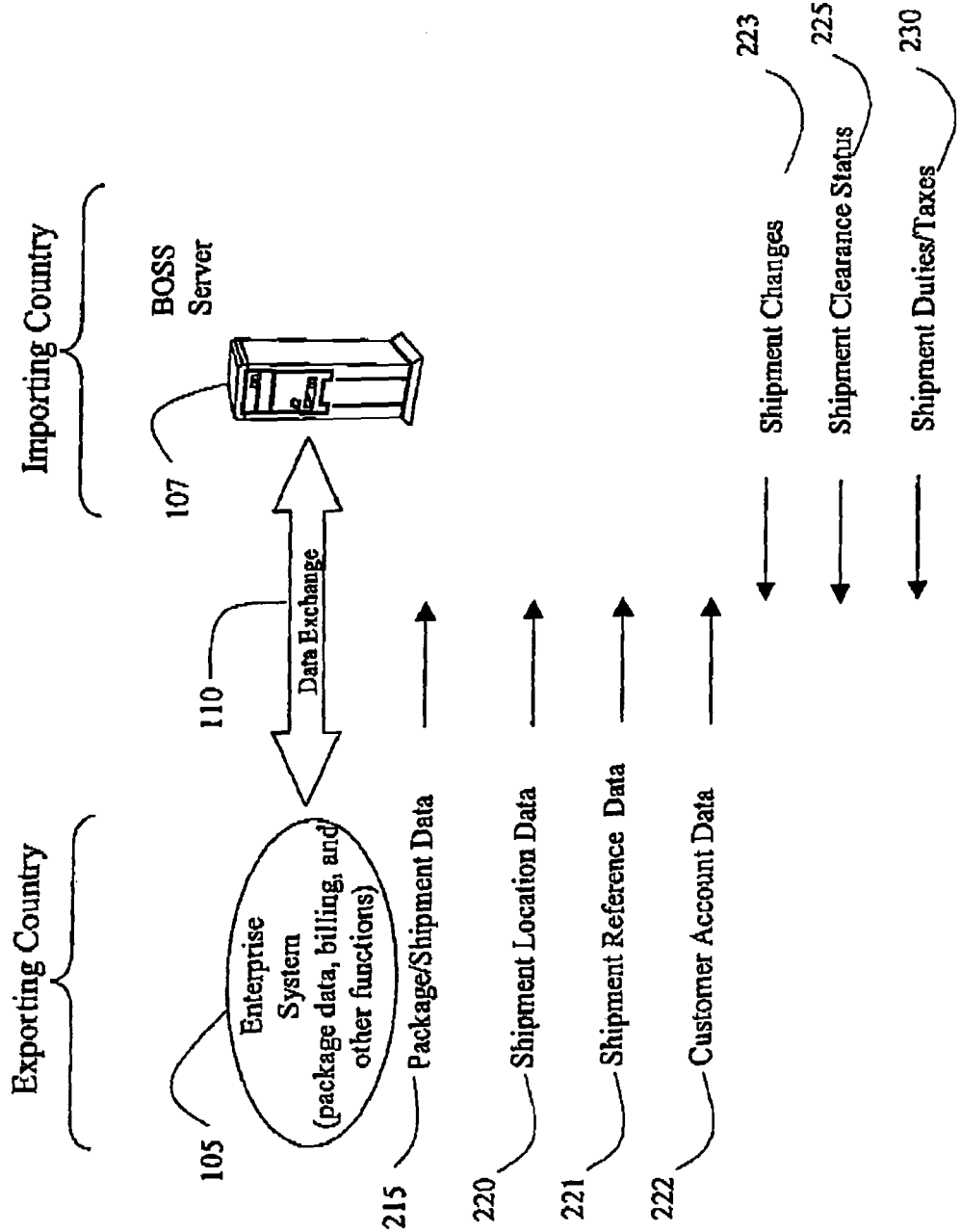

FIG. 5 illustrates one embodiment of the interaction between the Enterprise System and the Brokerage Operations Support System Server according to the principles of the present invention.

Figure 6:
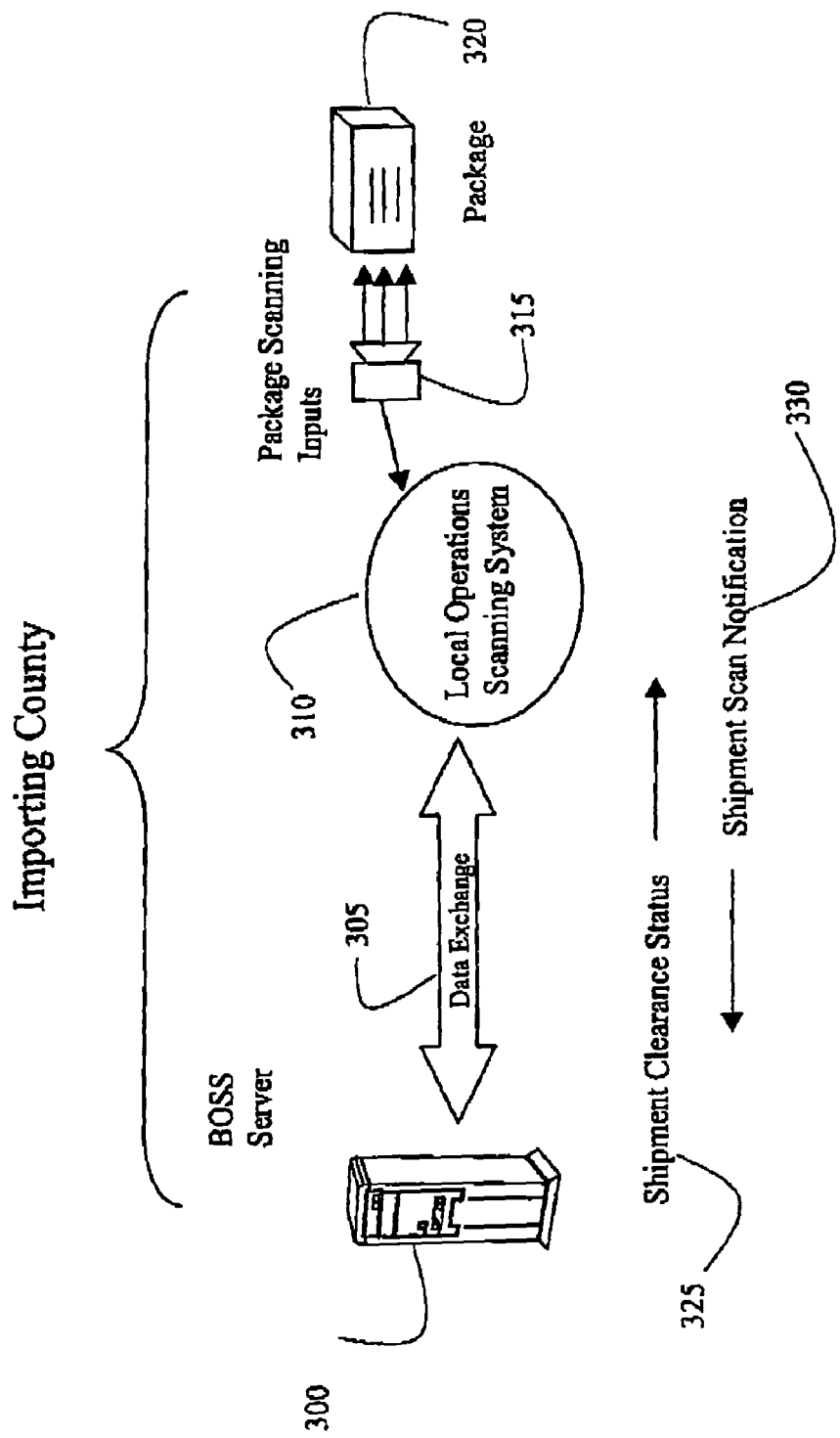

FIG. 6 illustrates one embodiment of the interaction between the Brokerage Operations Support System Server and the Local Operations Scanning System according to the principles of the present invention.

Figure 7A:
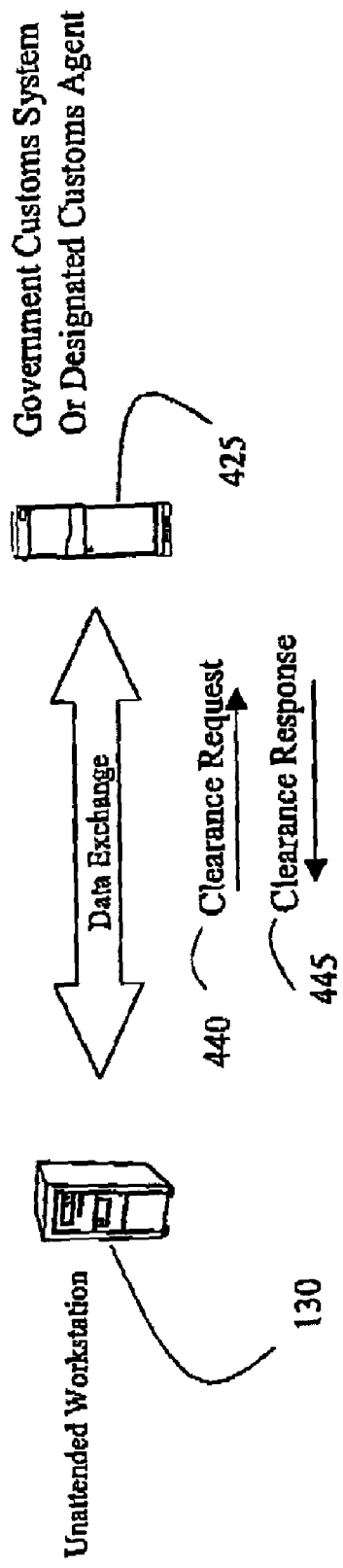
Figure 7B:
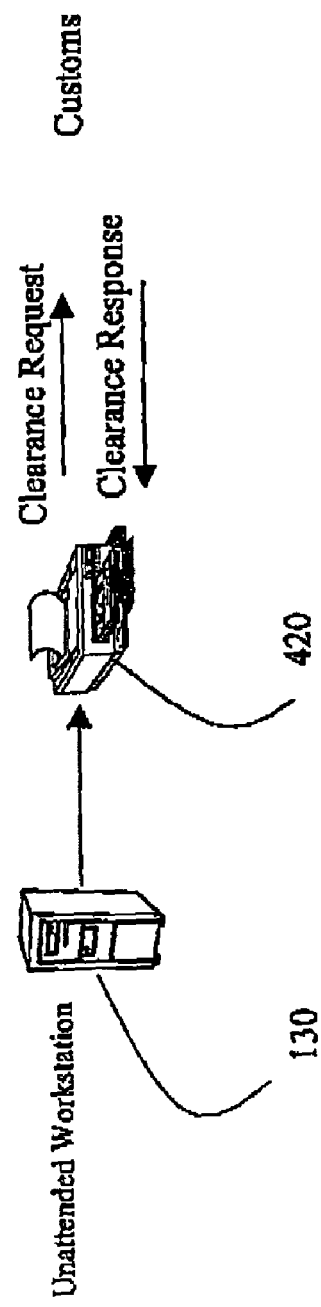

FIGS. 7a and 7b illustrate one embodiment of the interaction of a workstation with the Customs Office's systems or a customs agent according to the principles of the present invention.

Figure 8:
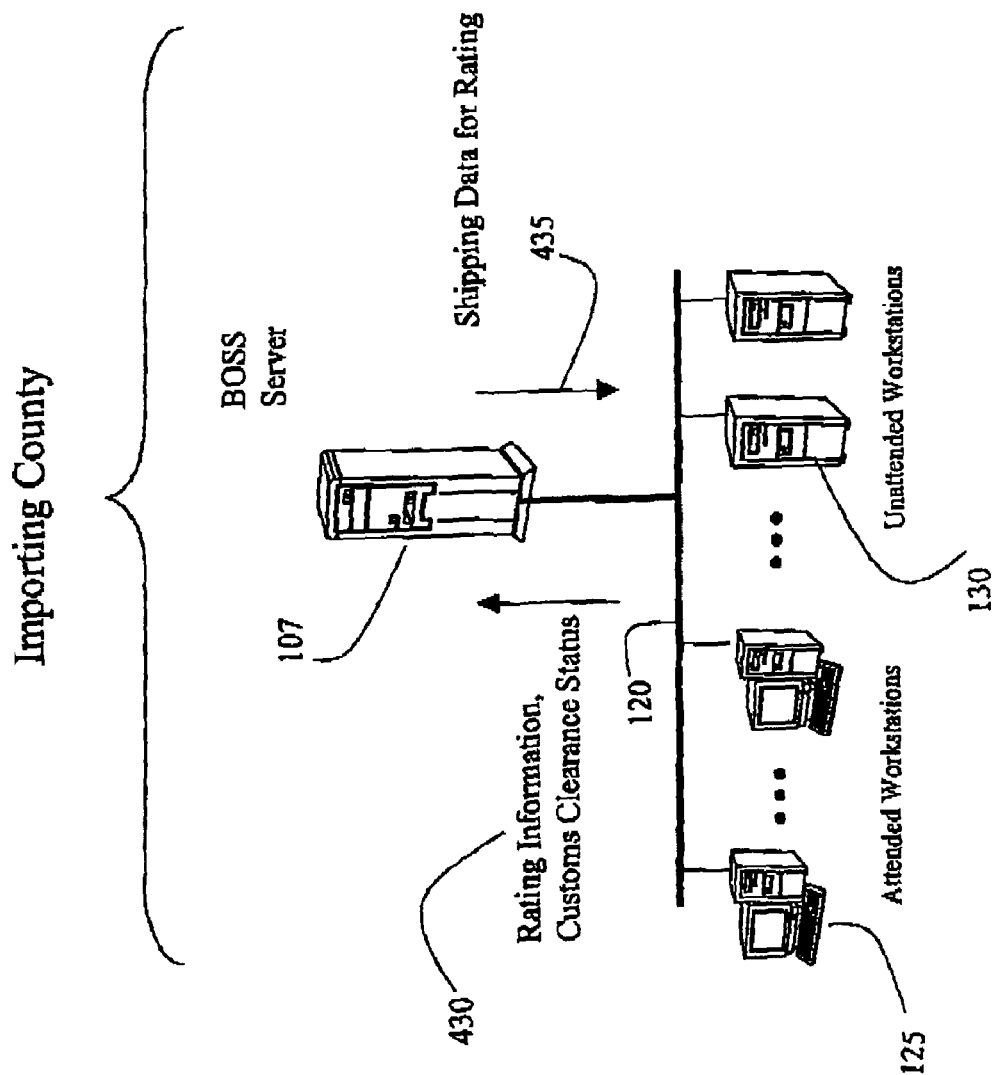

FIG. 8 illustrates one embodiment of the interaction between the Brokerage Operation Support System Server and the workstations according to the principles of the present invention.

Figure 9A:
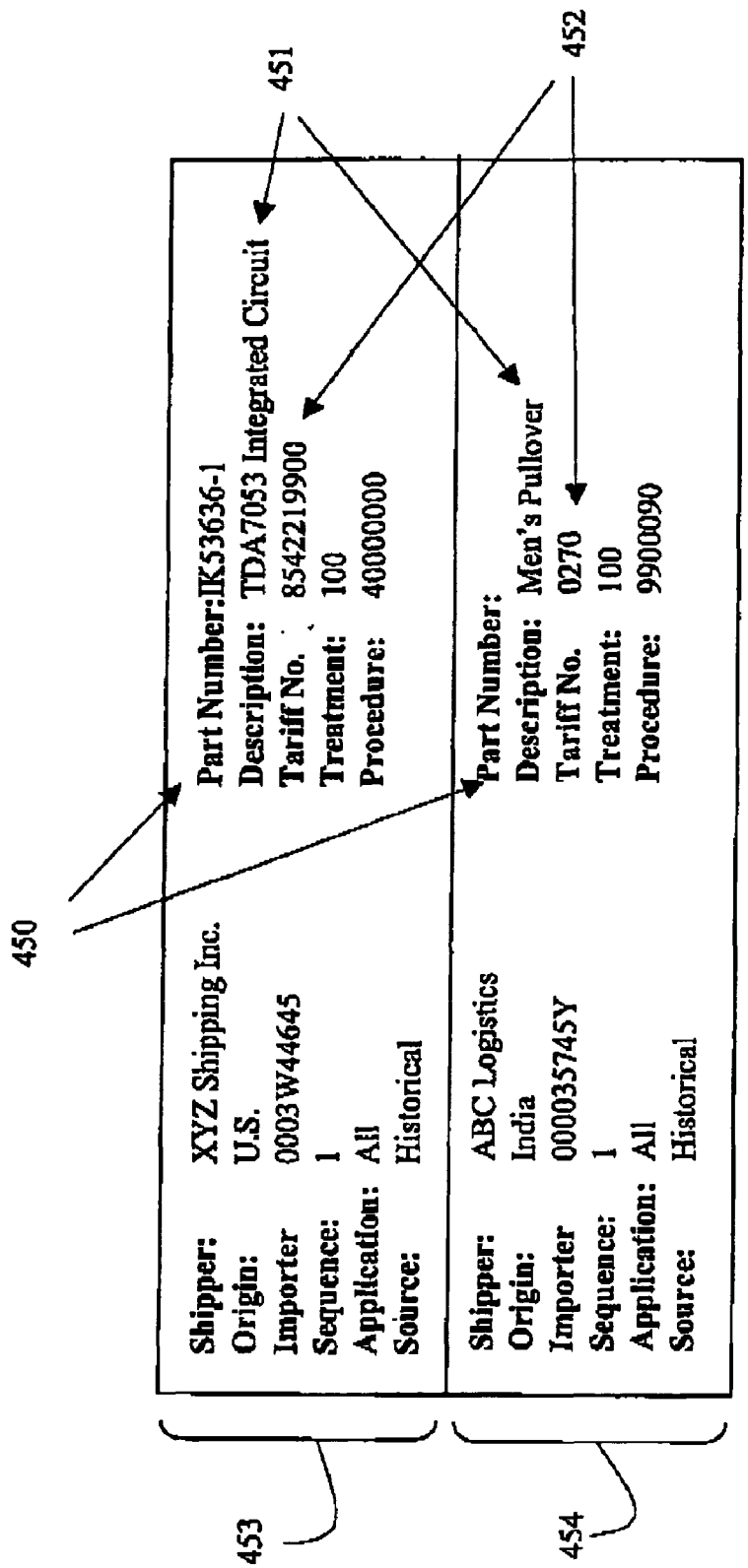
Figure 9B:
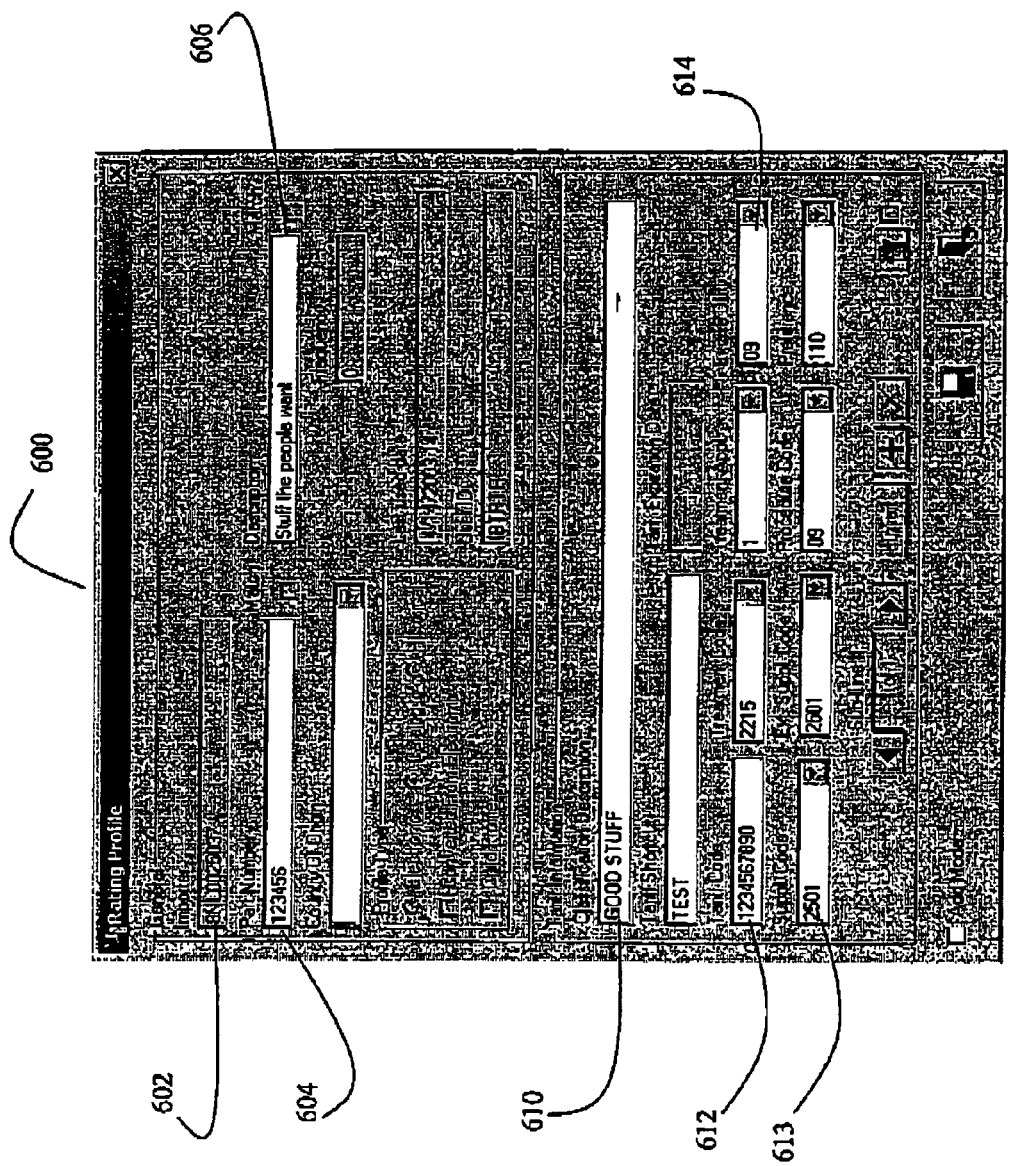

FIGS. 9a and 9b illustrate one embodiment of the contents of the Rating Profile according to the principles of the present invention.

Figure 10A:
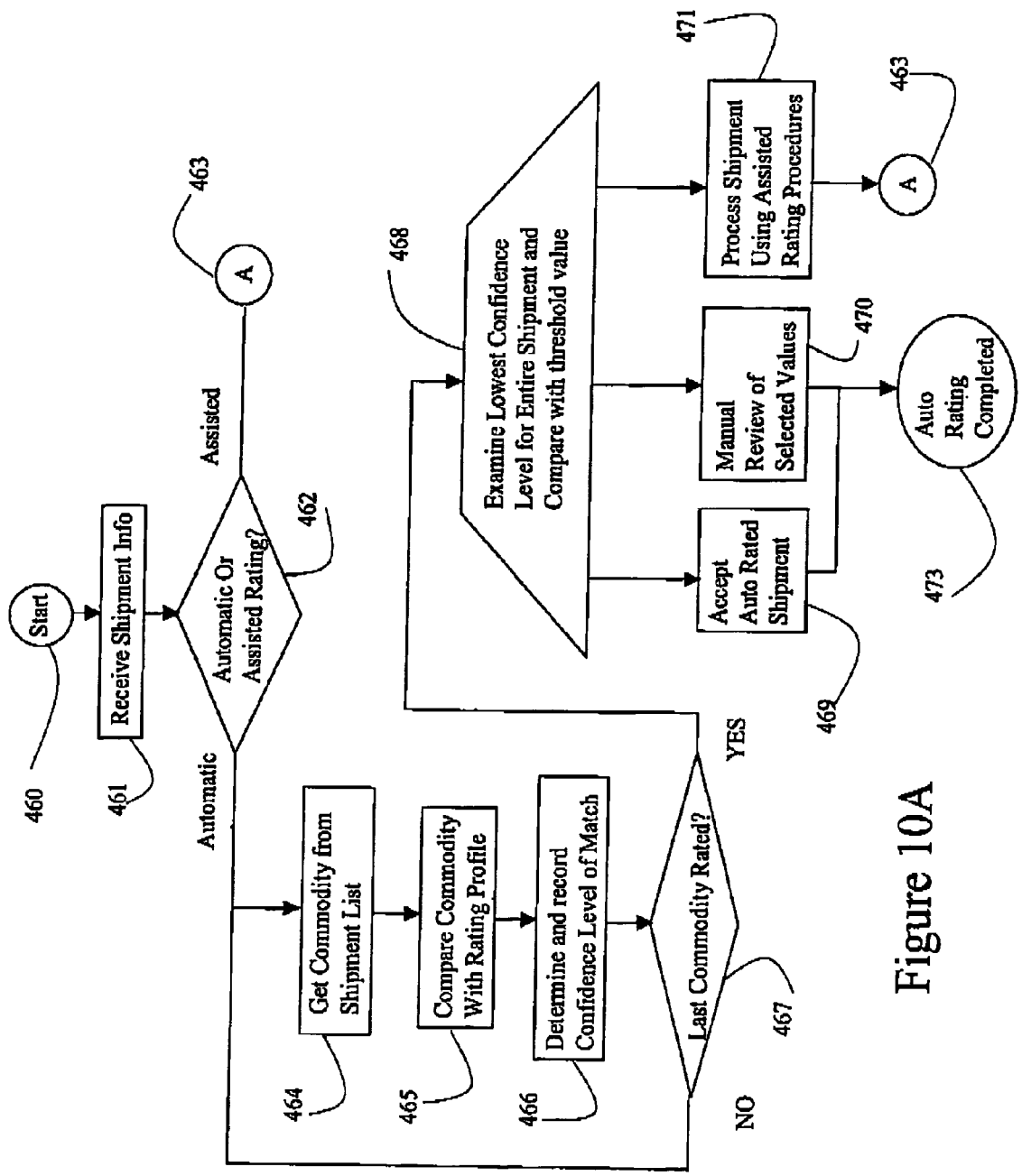
Figure 10B:
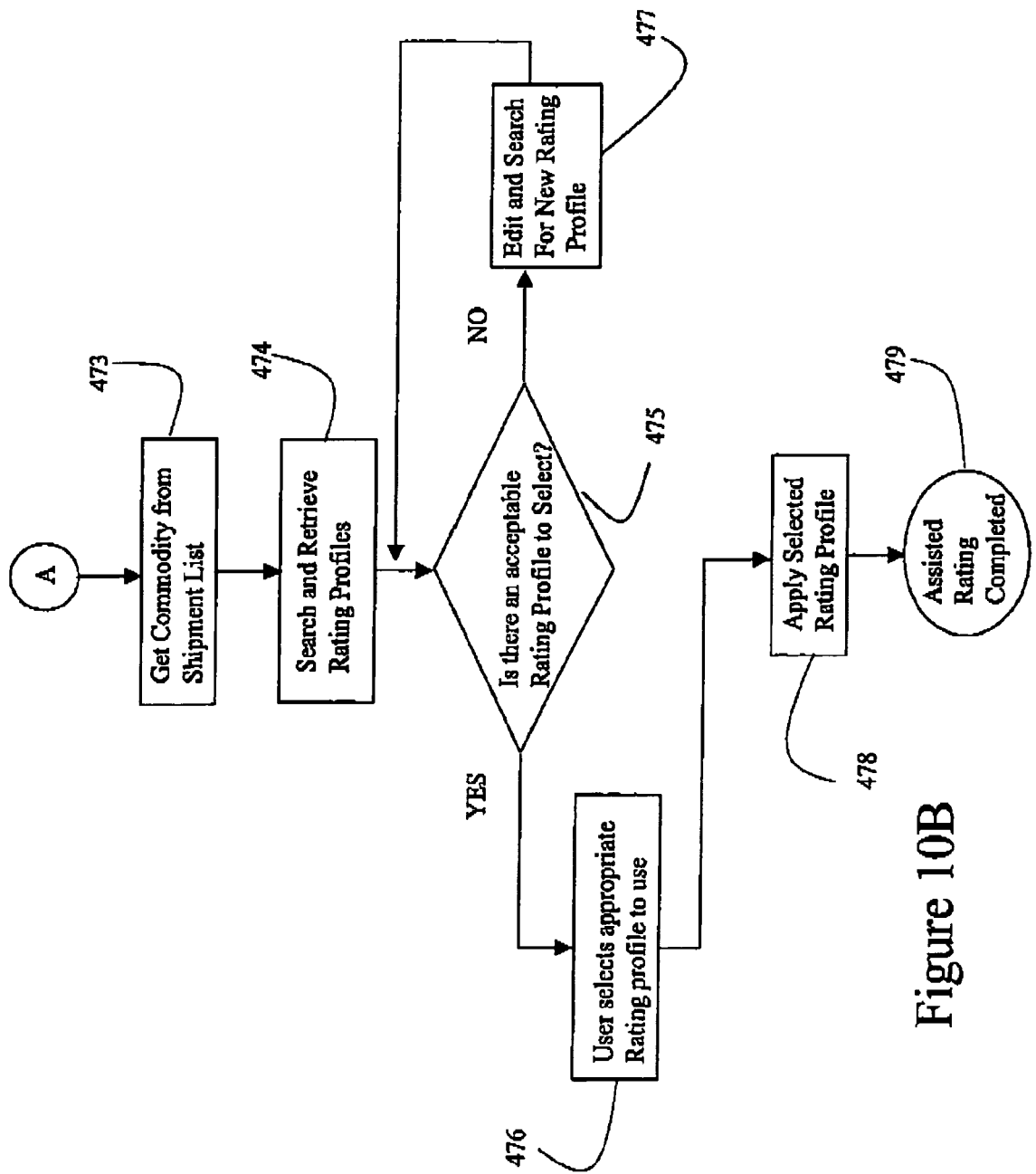

FIGS. 10a and 10b illustrate one embodiment of the process of rating according to the principles of the present invention.

Figure 11:
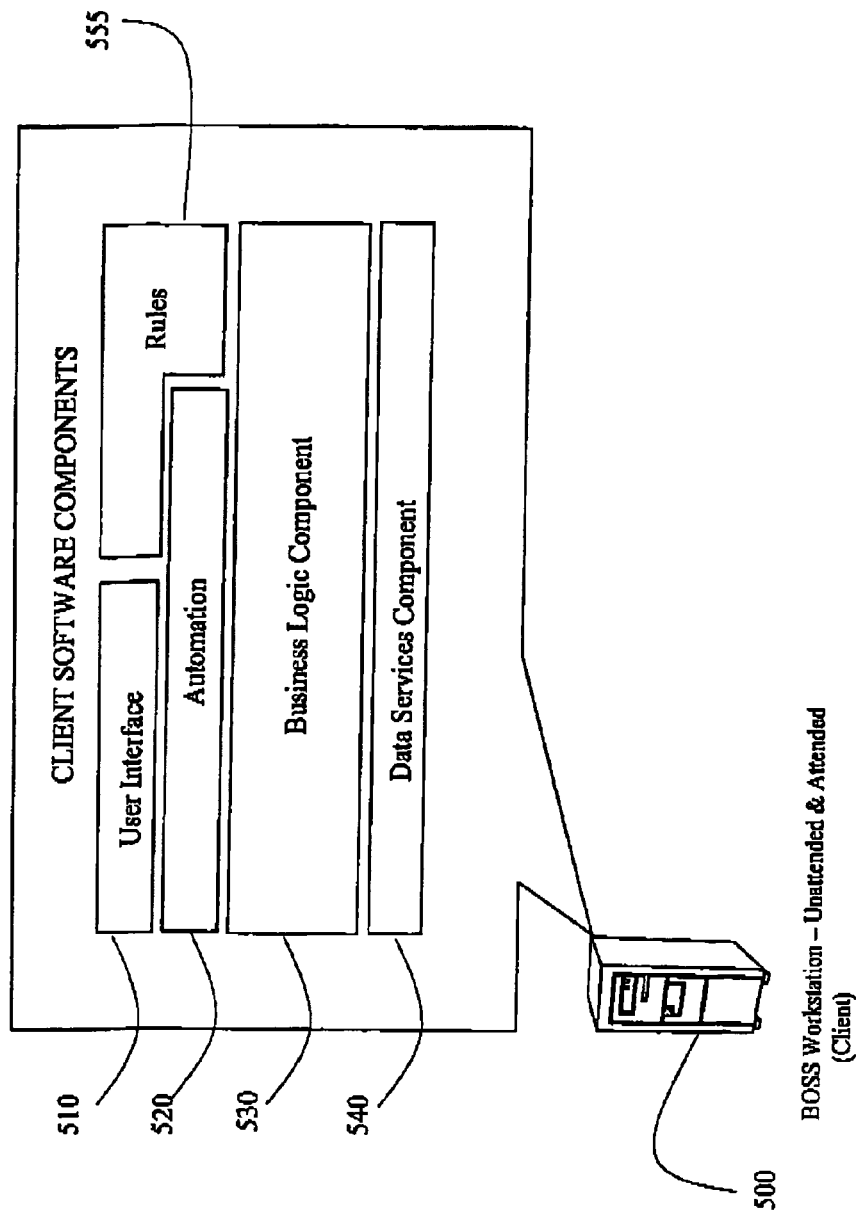

FIG. 11 illustrates one embodiment of the client software architecture according to the principles of the present invention.

DETAILED DESCRIPTION OF THE INVENTION

The present inventions now will be described more fully hereinafter with reference to the accompanying drawings, in which some, but not all, embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The system of the present invention facilitates the process of importing goods into a country. The goods can be considered as any item that is being imported to a country as part of a shipment. Goods can be of any type and nature, ranging from agricultural products to industrial goods. Further, the goods can encompass generic items such as 'letters.' Typically, a plurality of goods are packaged and bundled into a shipment, although the goods may be of a common type. In order to import a shipment into a country, several regulatory requirements must be met prior to the local country's customs officials clearing the shipment for local delivery. The requirements to 'clear' a shipment (i.e., obtain clearance from the governmental Customs Office) vary from country to country, but frequently follows similar principles. Until clearance is obtained, the shipment cannot be delivered and must remain in storage, usually in a restricted access warehouse near the point of entry. Obviously, it is desirable to rapidly and timely obtain customs clearance so that shipment may be delivered with minimum delay and storage.

The customs clearance usually requires payment of certain fees. The type of fees vary according to each country and are known as government imposed value-added taxes, fees, import duties, etc. (collectively referred to hereinafter as duties and tariffs). The amount is frequently based on the type of goods, their value, and quantity imported. The values of certain fees can also depend on associated transportation costs. Nevertheless, these fees do not include the costs of shipping the goods by the carrier. In many cases, the shipper will reimburse the carrier for paying the fees to the regulatory entities on behalf of the shipper.

The process of determining the total cost associated with the importation of a good (excluding transportation costs) is referred to as 'rating.' Usually, the shipper (the entity originating the shipment) or the consignee (entity receiving the shipment) relies on the common carrier or other third party to rate the shipment. Because the rules for determining duties and tariffs vary from country to country, rating a shipment is complicated. Further, the rules governing the fees are subject to change by government decree, resulting in occasional changes in fee structures. For example, a country may decide to increase duties for importing goods exported from a specific exporting country as a political response to the specific exporting country's actions. Consequently, the determination of fees associated with shipment may be complicated.

The present invention allows, in part, a common carrier to rate a shipment by applying the regulations of the importing country even when the information provided by the originator describing the goods in the shipment lacks tariff codes. As rating is determined by each country's rules, the Brokerage Operations Support System ("BOSS" or "BOS System") provides a local system comprising a server and workstations, typically located in the importing country, employing the appropriate rules to rate the shipment. The BOSS can be replicated in each country where desired by adapting the system to use appropriate rules and data for that country. The BOSS defines a core set of functions and a rule library that can be adapted by each country where it is deployed. Thus, the BOS System is a generic platform that can be adapted to facilitate brokerage operations for any country. The modifications can be programmed locally without redeveloping the overall system's core functionality. In this manner, a flexible, reusable, distributed system is created to support brokerage operations in a plurality of countries.

The present invention also interacts with the Customs Offices' systems to request and obtain clearance for the shipment. The clearance status information is used in the carrier's automated shipment processing system(s) to appropriately identify that shipments are cleared for delivery. Further, the present invention also interacts with the Enterprise System the carrier may operate to communicate status, customer, and financial related data.

A high level deployment configuration illustrating one embodiment of the present invention is illustrated in FIG. 1. FIG. 1 illustrates a shipment 6 being transported along some route from the exporting country to the importing country. Various transit countries may be involved and various modes of transportation may be used. The present invention is directed to the processing and flow of information regarding the shipment, not the handling of the shipment itself. As will be seen, there are instances where the handling of an international shipment interacts with the BOS System, but the BOS System does not determine the logistics of how the shipment is handled or transported.

In FIG. 1, it is presumed that the Exporting Country 1 is the origination of the shipment 6 and Importing Country "A" 4 is the destination of the shipment. It is further presumed the carrier in the Exporting Country 1 maintains a Carrier Business System 2 that collects and maintains various information regarding the shipment. Such systems that collect, bill, and manage shipment information are well known in the art of carrier management systems. The Carrier Business System may be embodied as a logical collection of sub-systems that in the aggregate perform the various required business functions. Information regarding the international shipment is conveyed using conventional data communication facilities 3 such as the Internet, private networks, or other telecommunication facilities to the Carrier's International Shipping System ("Enterprise System") 105. The Carrier International Shipping System maintains and coordinates various information focusing on international shipments from various exporting countries. The Enterprise system 105 is illustrated as deployed in a separate Country "X" 8; however, this country could be the Exporting Country 1, Importing Country "A" 4, or most likely, a third country. Further, the Enterprise System 105 may comprise several subsystems that collectively perform the necessary functions associated with managing international shipments. Further, in some embodiments the Enterprise System 105 may also incorporate the Carrier Business System 2. As will be discussed, the Enterprise System 105 in conjunction with the Carrier Business System 2 maintains information regarding international shipments, billing related information, status information, and customer information. In practice, the Enterprise System Carrier Business System 2 may be implemented using a number of mainframe and mini-computers, and may involve the coordination of numerous separate systems. It is not relevant how the either system is implemented or located in order to demonstrate the principles of the present invention. Hence the scope of the "Enterprise System" and Carrier Business System can be broad and encompass various aspects of information systems.

The Enterprise System functions as an information gateway for information required to be sent to, and information received from, various BOS Systems in other countries. In FIG. 1, the Enterprise System 105 communicates information to two separate BOS Systems in two other Importing Countries 4, 16. In practice, the present invention can be practiced with only a single BOS System deployed in one importing country or may involve more than two as illustrated. In FIG. 1, because the shipment 6 is destined for Importing Country "A" 4, the Enterprise System communicates the required information using traditional data communication facilities or networks 110 to the BOS System 100 associated with Importing Country "A" 4. Similar facilities 13 may be used, but are not required, for communication between the Enterprise System and other BOS systems 100b.

The BOS System 100 in turn, communicates with Government Customs Systems 135 as well as Shipping Handling Systems 115 operated by the carrier in the importing country. The BOS System 100 interacts with the Government's Customs Systems 135 for requesting and obtaining customs clearance. This typically is an electronic system deployed by the Government of Importing Country "A" to facilitate customs clearance operations. The BOS System also interacts with the Shipping Handling Systems 115 to ensure that handling of the shipment is in accordance with the clearance status. The Shipping Handling Systems are typically affiliated with the carrier and are used to process imported shipments. The Shipping Handling Systems frequently include Local Operational Scanning Systems (not shown), which identify individual shipments for appropriate handling.

The BOS System 100b may be replicated in other countries, such as Importing Country "N" 16. Although the BOS System 100 is primarily comprised of the system deployed in the importing country, it is apparent that additional software modifications may be required. Specifically, the BOS System 100a programmed to communicating with the Government Customs Systems may be programmed differently in another BOS System 100b. This is also the case when the BOS System 100a communicates with the Shipping Handling Systems 115 in the different countries.

The BOS system accommodates interfacing with different systems in each importing country by being designed with application modules, called 'packages' that are classified as 'core' or 'local.' The 'core packages' incorporate functionality common to each BOS system for deployment in each importing country. The 'local packages' incorporate functionality unique to each country.

To illustrate the core versus local aspects, consider the BOSS 100a interfacing with a communication facility 110 to receive shipment information from the ISES 105. The function of receiving shipment information from the Carrier International Shipment Enterprise System is a common function required in each BOSS 100a, 100b, regardless of which country the BOS System is affiliated with. Thus, receiving, processing and storing shipment information is a 'core' function. On the other hand, the BOS System 100a also interfaces using a communication facility 15 to a Government Customs System 135. This interface will likely vary from country to country. Similarly, the interface between the BOS System 100a and the Shipping Handling Systems 115 may vary from country to country. Thus, the details associated with customs interface illustrate "local" functions are typically programmed by administrative personnel in the Importing Country. Another example of a "local" programming aspect is the human-machine interface. Each country typically customizes the screens to reflect the appropriate language and procedures for that country. The design principle of separating "core" from "local" processing allows a common BOSS platform to be developed, but which can be adapted for each country's use by defining the appropriate "local" programs. As will be seen, the BOS System provides a library of rules that facilitate defining the appropriate "local" programs. Various other functions with the BOS System 100a are defined as 'core' and 'local.'

An overview of one embodiment of FIG. 1 is illustrated in greater detail in FIG. 2. FIG. 2 illustrates the main components of the BOS System 100, their relative locations, and their interactions with other systems and components.

The International Shipment Enterprise System 105 interacts with the BOS System 100 using the aforementioned communication facility 110. One of the main types of interaction is providing shipment data from the Enterprise System 105 to the BOS System 100 for rating and providing the rating information back to the Enterprise system 105. Another type of interaction involves communicating the custom's clearance status from BOSS to the Enterprise System. The BOS System obtains the custom's clearance status by interactions between the unattended workstations 130 and the Government Customs Systems 135. These interactions are detailed subsequently.

In FIG. 2, the BOS System 100 comprises two main components: the BOSS Server ("Server") 107 and the BOSS Workstations 108. The BOSS Server 107 interfaces in a bi-directional manner with the Enterprise System using a variety of communication technologies 110. The BOSS Server receives and stores shipment information from the Enterprise System and acts as a gateway coordinating dissemination of shipment related information. Shipping information is typically sent to the BOSS Server by the originating country's Enterprise System 105 soon after the shipment information is obtained, which is typically much sooner than the arrival of the shipment at the point of entry of the destination country. Because the exporting country has collected information regarding the destination of a shipment and knows the destination country, the Enterprise System directs the communication to the appropriate destination BOS System. The determination of the appropriate BOS Server can be accomplished by the Enterprise System using a look-up table that maps the destination country for a shipment to the specific BOS Server serving the importing country.

The second major component of the BOSS is the workstations 108. The workstations retrieve information stored in the BOSS Server 107 and processes shipment information to determine the appropriate tariffs and duty (e.g., to rate a shipment), a process frequently simply called 'rating.' Typically, depending on the importing country, a single workstation or as many as several hundred workstations may be deployed in a disperse geographical arrangement. Consequently, a LAN or WAN 120 is typically employed to allow remote communication with the BOSS Sever 107. The workstations are classified as unattended workstations 130 or attended workstations 125. Typically, an embodiment of the system in an importing country will have a plurality of both types. Both attended and unattended workstations are viewed as the 'users' of the BOS Server.

The BOS System 100 communicates with two main local systems typically located in the importing country. The first is the Shipping Handling System 115 shown generally in FIG. 1, that handles various shipping operations in the importing country. Typically, a shipping handling system performs functions for tracking, notification, scheduling, and sorting packages. The handling systems frequently use optical bar code scanners to read labels affixed to packages to facilitate these functions. These systems read codes identifying the shipment and store data pertaining to the shipment during processing. While 'scanning' denotes a specific operational method of processing machine readable indicia, other embodiments are included, such as optical character recognition, radio-frequency tag identification, magnetic ink reading, multi-dimensional code readers, or other identification technologies.

One such shipping handling system interacting with BOSS is the Local Operational Scanning System 310 ("LOSS") shown generally in FIG. 2. The LOSS interacts with BOSS in one application in regard to customs clearance. Specifically, as imported shipments are processed, they are scanned by LOSS and checked against a previously recorded indication of the customs clearance status. Real-time feedback is provided to the operator, typically in an audible and/or visual form. Thus, shipments scanned at the port of entry and that are flagged as not having cleared customs are suspended from further delivery. The shipment is flagged and must be stored until clearance is obtained. Shipments that are cleared are allowed for further delivery processing by the handling systems. BOS System 100 provides customs clearance status information to the Local Operational Scanning Systems 310 to ensure that only cleared shipments are delivered.

The above interaction with the Local Operational Scanning System is predicated on receiving the customs clearance status from the BOSS system, which in turn requires the BOS System to obtain customs clearance status. To accomplish this, the BOS System 100 sends a request to the customs system 135 for clearance of a shipment, and receives a response from the customs system indicating whether a shipment has cleared. As discussed subsequently, the nature of this interaction varies from country to country. The interaction may be sophisticated involving Electronic Data Interchange or it may be a non-automated process involving transfer of printed documents. In some cases, the government appoints an agent to handle interactions on behalf of the Customs Office. Further details regarding each of the interfaces illustrated in FIG. 2 are discussed subsequently.

The BOSS Server 107 is typically implemented on a minicomputer, such as an IBM System AS/400 server, and incorporates a relational database for storing shipping information records. The software architecture of the BOSS Server can be modeled by dividing applications into two main layers—an Architectural Services layer and a Data Services layer. FIG. 3 illustrates the layers of the software in the BOSS Server. The Architecture Services are applications executing independently of user requests. These processes automatically 'wake up' upon receipt of shipping related data and handle essential processing, often communicating with other entities, such as the Enterprise System, LOSS or Customs Systems. Where possible, Architecture Services may also schedule processing to optimize resource utilization (e.g., load balancing). The Data Services processes are designed to handle user requests. These services either directly or indirectly, interact with the user and often involve selecting, storing, and updating data in the BOSS Server.

The Architectural Services layer includes a single System Control process 250 that provides overall control and coordination of the BOS System. The System Control process acts as a 'traffic cop' for all the server processes and ensures that the interaction between the services are working and communicating properly. Consequently, there is only one instance of this process executing on a given BOSS Server. Under the control of the System Control process are Server Control processes 254 (of which only one is illustrated) that manage the various Data Services 256. In addition, there are various other Architectural Services 252 that may be present. These may involve communicating messages or shipment related data to/from the BOSS server 107 and the Enterprise System 105, or between the BOSS Server 107 and the Local Operation Scanning Systems 310. A list of the Architectural Services and their functions is included in Table 1.

TABLE 1

Listing of Architectural Services

| Service | Function |
| --- | --- |
| System Control | Controls the state of the system and ensures that the appropriate architecture services are running. |
| Server Control | Controls the Data Services and ensures that the appropriate services are running. |
| Message Publication | Publishes available messages to other corporate systems through a common messaging infrastructure. The target systems may be local or remote. |
| Message Subscription | Receives messages from other corporate systems through a common messaging infrastructure. |
| Download Post | Receives and stores new shipment and customer data from Enterprise System for the assigned importing country. |
| Master Data Post | Receives and stores updates regarding importing country's government customs. |
| Invoice Status Update | Receives updates about Invoice Scanning and updates Shipments as invoices are scanned. |
| Locking Manager | Manages the state of various objects being used by various BOSS processes or users to avoid deadlock and incorrect synchronization of data. |
| Local Scanning | Receives files from local package handling systems pertaining to shipment handling. |
| Status Monitor | Captures summary information about recent shipment volumes for reporting on current operational status. |

The other type of processes executing in the BOSS Server are Data Services. These are designed for interacting directly or indirectly with user requests, typically in conjunction with rating commodities of a shipment. These processes frequently result in modifying or processing shipment data stored in the BOSS Server. The user requests originate from BOSS workstations 108 (either attended or unattended), and are structured to handle multiple user requests because they're typically several workstations interacting with the Server. The Data Services generally perform generic functions, such as reading information ("GET"), writing information ("POST"), and extracting information ("LIST"). Because these actions may be requested by several workstations at a given time, these Data Services are designed having two components—a router and the service itself. There is only one router component that receives requests and its function is to route the request to the appropriate instance of the service component. For example, the structure of the "GET" Data Service action is shown in FIG. 4. A Requesting Client 270 submits a request via a Request Queue 271 to the Get Router 272. The Get Router receives all requests and determines which of any available Get Service components are available. The Get Router 272 sends the request via a Get Queue 273 to an available Get Service 274 component (of which only one is illustrated). Since the action may require access to shared information (i.e., information simultaneously updated by another Data Service), "lock" managers are used to control access. These are well known in the art of database architecture to ensure synchronization of data when accessed by multiple processes. In this case, the Get Service 274 requests, via a Lock Queue 275, the Locking Manager 276 to lock the appropriate information while it is being processed. The Locking Manager responds to the Get Service 274 component via a Reply Queue 277. The Get Service 274 component then provides the response to the Requesting Client 270 via a Response Queue 278.

A list of Data Services available is shown in Table 2, as grouped by various utility functions. Many of these are relevant to the types of requests the workstations send to the BOSS Server.

TABLE 2

| Service Group | Service Name | Function |
| --- | --- | --- |
| Shipment Services | Shipment List | Receives a variety of criteria to create an extract of Shipment and Declaration information to present back to the requesting user. |
| | Get Shipment | Returns information regarding a single Shipment so that it can be edited and subsequently saved. |
| | Get Shipment Group | Returns a collection of Shipments that are to be consolidated into a single Shipment for further processing. |
| | Get Block Number | Returns the next unused number from a specified block of numbers to be used for identification of objects for Government Customs Offices. |
| | Get Exchange Rate | Returns a rate of exchange for two identified currencies for a specific date the rate is to be used. |
| | Get Tariff | Returns the tariff information, given a harmonized tariff code. |
| | Post Shipment | Stored a Shipment back to the database. This Data Service receives its request from the Parse & Route Data Service. |
| | Create Message | Creates any required message for the Shipment and stores them in a transaction table to be posted. This service is called by Post Shipment when required. |

TABLE 2-continued

| Service Group | Service Name | Function |
| --- | --- | --- |
| | Unload Prep | Formats the Shipment information and forwards it to appropriate Enterprise System. This service is called by Post Shipment when required. |
| | Build Rating History | Creates Rating Profiles from the Information in the Shipment when requested by the client. |
| Customer Services | Customer List | Receives various criteria to create an extract of Customer information to present to user. |
| | Get Customer | Returns information associated with a single customer so that it can be edited and subsequently saved. |
| | Get Rating Profile | Retrieves collection of Rating Profiles based on provided criteria. |
| | Manufacturer List | Retrieves a list of Manufacturers from the data based on provided criteria. |
| | Post Customer | Stores the Customer information back to the database. This service receives its request from Parse and Route. |
| | Post Rating Profile | Stores a Rating Profile that has been edited during a Customer Session back to the database. |
| | Post Manufacturer | Saves Manufacturer information back to the database. |
| Movement Services | Get Brokerage Movement | Returns a collection of Brokerage Movements based on the provided criteria. |
| | Get Master Waybill | Returns a Master Waybill based on the provided criteria. |
| | Post Master Waybill | Saves a Master Waybill in the database. |
| | Post Waybill Update | Saves an update that should be applied to a Master Waybill at a later time. |
| Security Services | Get User Profile | Returns a collection of User Profiles based on the provided criteria. |
| | Get User Signature | Builds a file containing the graphical representation of a User's signature and returns the location of the file. |
| | Get Security Group | Returns a collection of security groups based on the provided criteria. |
| | Post User Profile | Saves a User Profile in the database. |
| | Post User Signature | Saves the graphical representation of a User's signature to the database from a file placed in a shared location. |
| | Post Security Group | Saves a Security Group in the database. |
| Utility Services | User Space Manager | Allocates and manages temporary shared storage for other services. The most common use is to store all of the records for a transaction that may exceed the size of a single transmission |
| | Generated Response Queue | Creates uniquely named Data Queues for clients as they log onto the system. At logoff, the service purges the Data Queues. |
| | Get Message | Receives message from Enterprise System |
| | Send Message | Sends message to Enterprise System |
| | Parse & Route | Serves as the routes for processes storing data. This services runs as a single instance and transforms multiple requests over multiple transmissions, forwarding them to the correct storage services. The information is consolidated into a User Space so that the forwarded requests need only contain the name of the User Space, rather than the original data. |
| | COS Reply Process | Monitors the COS for reply messages that could indicate problems with remote transactions and write these to a log file for future reference. |

Data Services

FIG. 5 further illustrates the interaction between the BOSS Server 107 and the Enterprise System 105. The interaction illustrates the type of information that may be communicated from one system to another and is not intended to illustrate any necessary time order or dependency of the messages between the two components. The two systems exchange data via a communications network 110 that can be based on a variety of technologies. This includes Internet, WANs, LANs, private facilities, switched facilities, X.25, frame relay, and similar communication networks. The facilities may be privately operated or may rely on common telecommunication carriers. Further, a variety of protocols may be used to convey the messages and required parameters, with a variety of error detection and correction routines, security mechanisms, flow control algorithms, etc. This includes the various Open Systems Interconnection (OSI) protocols as well as proprietary and standardized Electronic Data Interchange (EDI) messages. Alternatively, Internet based protocols such as XML could be used.

In FIG. 5, the BOSS Server 107 serving a specific importing country is typically deployed in that country for administrative convenience. However, alternative embodiments may locate the BOSS Server 107 in a different country. This may be preferred when there is a larger or more commercially significant country adjacent to the importing country. Alternatively, it is possible that a single BOSS Server may have sufficient processing capacity to process and store shipment data for more than one country. This may result in deployment of a single BOSS Server in a central area to several countries. A single BOSS Sever is not restricted to processing shipment data for a single country. Alternatively, the functionality of the BOSS Server may be integrated with other Enterprise System functionality. In summary, the architecture and deployment illustrated is only one embodiment and is not intended to limit application of the invention's principles.

Similarly, the Enterprise System 105 can operate from any country. The Enterprise System may be located in the same country as the main corporate enterprise system, or in the exporting country. Thus, an Enterprise System located in the United States could receive shipment information for shipments originating from England that are destined for France. The Enterprise System in the United States would then send the appropriate shipment information to the BOSS Server associated with France. The choice of location for these systems is based on business, technical, and administrative factors.

The Enterprise System 105 provides several types of information to the BOSS Server 107, which stores the data. The main type of information provided by the Enterprise System is shipment data 215. This information is required to construct a Declaration for the shipment, and typical information components utilized (but not all) are illustrated in Table 3.

TABLE 3

| Information | Meaning |
| --- | --- |
| Originator | Entity originating the shipment |
| Destination | Entity to which shipment is to be delivered |
| Contents | Description of the contents |
| Quantity | Number of items in the shipment |
| Value | Declared value of shipment |
| Tariff Code | Numerical value indicating the nature of the contents |

TABLE 3-continued

| Information | Meaning |
| --- | --- |
| Size | Dimensions of the shipment |
| Weight | Weight of shipment |
| Date of Origination | Date shipment was accepted |
| Service Level | Manner of transport (air, ground, etc.) |

The means by which the Enterprise System initially collects and organizes the shipping data can occur in a variety of ways. For example, a carrier may enter the information into a carrier management system as are well known in the art, upon accepting the shipment, which then communicates the data to the Enterprise System 105. Alternatively, the carrier may allow the originator of the shipment to enter data into a carrier management system that then transfers data, using for example, the Internet to the carrier's Enterprise System. Regardless of how the carrier collects and structures the data, the shipment data is communicated to the BOSS Server as soon as the Enterprise System has the required shipping data.

Those skilled in the art recognize that the shipment data conveyed depends on the nature of the shipment. All variables are not provided for all shipments. For example, if the international shipment comprises a single letter under a threshold weight (e.g. 6 ounces) and has certain size dimensions, then the weight and dimensions of the item are usually not required. These values may be set to default values and the contents described in a generic manner (e.g., 'letter containing documents'). On the other hand, a shipment comprising machine goods with significant weight (e.g., 1000 lbs) would require providing the shipment's dimensions, weight, and other attributes (description of the contents, quantity, and value).

Other shipping information may be communicated to the BOSS Server to facilitate the carrier's processing and handling associated with the shipment. For example, a shipment identifier value (e.g., shipment number) is typically allocated by the carrier to track and identify the shipment. Other information regarding consignee contact information (e.g., telephone numbers), internal routing and handling instructions, processing codes, et cetera is typically included in the information communicated between the Enterprise System and the BOSS Server. Detailing all the specific information is not necessary to illustrate the rating of a shipment and other inventive aspects of the present invention.

The Enterprise System 105 sends the shipment information 215 to the appropriate BOSS Server as determined by the shipment's destination country. Typically, the Enterprise System 105 sends shipment information 215 to the appropriate BOSS Server 107 as soon as the Enterprise System has complete receipt of the shipment information. Typically, the BOSS Service obtains the shipment information prior to the arrival of the shipment into the importing country's point of entry. The information for a shipment may comprise a single package or several packages.

The second type of information provided by the Enterprise System is Shipment Location Data 220. Although not illustrated in this figure, the Enterprise System receives messages from various shipment handling systems regarding the processing of the shipment. These systems may be employed by the carrier to track and handle a shipment during transport. For example, the carrier may record the loading of a shipment onto a vehicle, or record the transfer of the shipment between vehicles (wherein "vehicle" broadly encompasses a ship, airplane, train, truck, van, or any other apparatus for conveying cargo). In particular, the carrier records the shipment location and status upon departure from or entry into a country. Thus, as a shipment is handled along the various points of the route to the importing country, various location indications are collected by the Enterprise System and asynchronously communicated to the BOSS Server.

The BOSS Server typically receives location indications for a given shipment at least at two points in time: (1) when the shipment is processed upon departure from the exporting country, and (2) when the shipment is processed upon receipt at the importing country's port of entry. Typically, other indications regarding the shipment's en route location are provided to the BOSS Server as various transit countries may be involved. The indications are stored in the BOSS Server database in a file associated with the shipment. As will be seen, users can query the BOSS Server via a workstation to determine where a particular shipment was last processed.

Shipment location information is used by BOSS in coordinating customs clearance. When shipment information is initially provided to the BOSS Server, an anticipated date of entry into the importing country is included. This allows the BOSS to 'forecast' a shipment's arrival and schedule the request for customs clearance. Shipments arriving early into the port of entry, whether by plane, ship, or truck, are held if the appropriate customs clearances have not been obtained. To minimize storage of goods at the port of entry, it is preferable that shipments arrive when expected. This allows efficient space workflow planning by personnel and related resources, including, warehouse workers, storage space, forklifts, etc. If a shipment is early or late, the BOSS Server is updated with the latest arrival estimates and continuously compares the anticipated date of arrival with the shipment's progress. This allows the BOSS Server to coordinate obtaining customs clearance with the anticipated arrival date. The BOS System interacts with the government Customs Office to issue the request for clearance based on the anticipated date of arrival into the port of entry. Thus, if the anticipated arrival time is earlier than anticipated, the BOS system can requesting customs clearance earlier than scheduled. Once clearance is obtained and received by the BOSS Server 107, the BOSS Server stores the status and forwards the clearance status to the Enterprise System 105, which may use this to facilitate shipment status tracking.

The BOSS Server also receives Customer Account Data 222. This data includes various items of customer data, such as the customer's name, account number, contact information, etc. Preferably, new customer account information is provided to the BOSS Server prior to the arrival of the customer's shipment so that new shipment data received by the Server can be associated with an established Customer Account. If not, the BOSS system can create a new Customer Account.

Finally, the BOSS Server also receives Reference Data 221 from the Enterprise System. As previously explained, the Enterprise System may encompass a variety of systems. In order to communicate information between the BOSS and the Enterprise System, the BOS System may use locally defined reference information to identify a shipment with the Enterprise System. Thus, the BOS Server may identify a given shipment using various reference designations or labels based on the Enterprise System subcomponent that BOSS is communicating with.

Information transferred in the other direction is now examined; specifically, information that is provided from the BOSS Server 107 to the Enterprise System 105. This information includes shipment changes 223, which reflect actions performed by users at the BOSS workstations at the importing country. For example, a user may rate a shipment and add tariff codes for each commodity. Or, a description of goods may be edited to clarify the contents. These changes are uploaded from the BOSS Server to the Enterprise System. Frequently, a single item may be decomposed into commodities and rated and tariffed individually. The individual commodities are indicated to the Enterprise System so that a clear record of the basis of rating the shipment can be provided to the customer.

Upon receipt of shipment information from the Enterprise System, the BOSS Server processes the shipment data, beginning the rating process. Rating is not performed by the BOSS Server itself, but rather by the attended or unattended workstations. Upon receipt of shipment information, the BOSS Server stores the information. The workstations subsequently request the data and rate the shipment. The workstations provide the results, including the duties/taxes/fees to the BOSS Server 107, which then communicates the rating information 230 to the Enterprise System 105. The Enterprise System uses rating information to update the appropriate accounts. Specifically, the customer's account is updated to reflect the rating amount associated with the specified shipment.

The BOSS Server also communicates Shipment Clearance Status 225 to the Enterprise System. As previously explained, the BOS System interacts with the importing country's Government Customs Systems to request and obtain clearance for a shipment. Upon receiving a clearance indication from Customs, the BOSS Server communicates the status for a specified shipment to the Enterprise System. This indication may trigger various other functions in the Enterprise System, such as initiating an invoice to the shipper for payment of the duties/taxes/fees that were paid by the carrier on the shipper's behalf. The carrier may also offer various tracking services to the shipper including providing customs clearance notification. The shipper may be provided with access customs clearance status information by accessing a web site and identifying the shipment, or the Enterprise System may notify the shipper in a predetermined manner for that shipment (e.g., sending an email notification to a specified email address).

The interface between the BOSS Server 107 and the Local Operational Scanning System (LOSS) 310 is illustrated in FIG. 6. FIG. 6 illustrates the LOSS located in the importing country, which typically is done for administrative and operational convenience. Since the BOSS Server is typically not co-located with the LOSS, communication can be accomplished using a variety of communication facilities 305 including the Internet, switched data access, virtual private network, or dedicated private facilities.

The LOSS communicates the location of a shipment to the BOSS Server. However, with the Local Operation Scanning Systems, the scanning indications or messages are directly communicated to the BOSS Server, whereas in the exporting or transit country the scan indications are processed by the Enterprise System and are communicated via the Enterprise System 105 to the BOSS Server 107 as previously discussed.

The Local Operational Scanning System 310 is illustrated as a single system, but is typically comprised of a plurality of systems coordinated to achieve scanning, storing, and processing of information received from several scanning devices 315. Thus, the LOSS may be implemented as a local system comprising a scan server communicating with various scanners. These systems may also coordinate and control various mechanical shipment handling systems, such as sorters, conveyors, etc.

The scanning devices 315 read bar code information on a shipment, illustrated in FIG. 6 as a package 320, during the normal handling and processing of the shipment in the importing country. Typically, the package 320 is moved using a conveyor belt or other mechanical means (not shown) past the scanner 315 that detects the package identification indicia and communicates shipment information to the Local Operation Scanning System. Although an optical scanner is illustrated 315, other technologies could be used to identify an item during processing, including single or multiple line optical character readers, radio frequency identification tags (RFID tags), magnetic or fluorescent inks, handwriting or character recognition, or manual operator input. After receiving the shipment identification data, the LOSS accesses an internal database indicating the customs status for that particular shipment. If a shipment clearance status message 325 is not recorded, the indication defaults to a "not cleared" status. Shipments that are not cleared for delivery result in the Local Operation Scanning System 310 taking immediate real time actions to ensure that the item is not delivered and place the package in a 'delivery hold' state. This action is dependent on the package handling systems used in the importing country. For example, personnel handling the package and operating a hand held scanner may hear audible feedback (e.g., a 'buzzer sound') indicating that the package has not cleared customs and should not be delivered. Alternatively, the package handling system may involve automated shipment or package handling controls that appropriately process based on the customs clearance status indication.

A "delivery hold" indication at the final port of entry typically results in temporarily storing the shipment. To accomplish the "delivery hold" capability, the BOSS Server 107 provides shipment clearance status 325 to the Local Operation Scanning System 310. The LOSS retains this information in a database and checks each shipment scanned to determined if a "delivery hold" is required. In FIG. 6, one embodiment is to provide the clearance status from the BOSS Server 107 directly to the Local Operation Scanning System 310, but this can be done indirectly as well. For example, recall that the BOSS Server provides Shipment Clearance Status 225 indications to the Enterprise System 105 (see FIG. 5). The Enterprise System could provide, in turn, this indication to the appropriate Local Operation Scanning System. However, this may result in additional delay in providing notification to the LOSS.

The process of BOSS obtaining customs clearance is illustrated in the embodiments shown in FIGS. 7a and 7b. In FIG. 7a, the communication of customs clearance preferably involves an unattended workstation 130 electronically communicating with the importing country's government customs system 425, or, alternatively, an agent's electronic system designated by the Customs Office. Depending on the importing country, the government may operate such a system and offer public access, or may contract the operation of the system to an agent. Although each unattended workstation could communicate with the customs system, typically a single unattended workstation is allocated to channel communication with the customs system. The basic information communicated from the allocated workstation is for the purpose of identifying a shipment and requesting for clearance of a shipment 440. The interface and protocol between the unattended workstations and the Customs Office 450 varies from country to country and can range from using Electronic Data Interchange standards to proprietary protocols. Thus, the allocated unattended workstation must be flexible and adaptable to a variety of communication protocols. The design of the BOS System facilitates development of the appropriate interfaces by allowing local programmers develop the interface modules defining communication with the government' customs systems.

In some embodiments, as illustrated in FIG. 7b, the government does not provide an electronic interface, either by a government customs system or a designated customs agent. Rather, the custom's office operates by manually processing paper-based documents. One approach for adapting the BOS system is to program the unattended workstation to print out the appropriate customs documents on a printer 420, which are then manually presented to customs officials. In this embodiment, the interface to the Customs Office 450 is manual. While it is desirable for the importing country to offer an electronic interface that can interface with the unattended workstations, the preferred embodiment for communicating with a specific government's customs computer system is dictated by the importing country's government Customs Office. The unattended workstation can be adapted to a variety of Custom System interfaces based on the country of deployment.

Once the Customs Office has cleared a shipment, the workstation receives the information either by automatic notification or, if a manual interface exists to the Customs Office, manually entry by a user at an attended terminal. In either scenario, the workstation updates the BOSS Server 107, which, in turn, notifies the Local Operational Scanning System and the Enterprise System.

Rating

Rating a shipment involves determining the appropriate taxes, duties, and fees for the commodities in the shipment according to the importing country's regulations. Rating requires information from the shipper (or exporter) about the commodities in a shipment and is typically is collected by the carrier when initially accepting the shipment. The commodities are required to be listed on the Declaration. The Declaration is a document provided by the exporter to the Customs Office detailing aspects of the shipment, including various descriptors of the contents. Each item is associated with one or more tariff codes, and the associated taxes, duties, and fees are determined using the tariff code along with other information provided in the Declaration (e.g., quantity, value of goods). If all the tariff codes for all the commodities in the shipment are provided by the exporter, rating the shipment by the carrier is straightforward. However, exporters usually do not provide the tariff codes for items, nor do they even provide a listing of the appropriate commodities. Rather, exporters usually provide the information of the goods as known to them, such as item descriptions and/or part number from a catalog. The carrier is then required to determine the appropriate tariff code from the description and/or part number.

As noted, rating is relatively easy when the shipment information is includes a sufficiently detailed and correct tariff code for each commodity. In the following discussions, it is presumed that a tariff code or commodity has not been provided for at least some of the goods shipped. Rather, only a description and/or part number is provided to the carrier. In practice, the descriptions or part numbers frequently do not directly correspond to a single tariff code. Often there are many terms for the same product (e.g., woolen vest, pullover, sweater, etc.). In other cases, a single item may correspond to several commodities. As previously indicated, a single "watch" may correspond to three commodities for rating purposes; a watchband, housing or case, and watch mechanism. Alternatively, an exporter may indicate only a manufacturer's part number for the commodity. Thus, rating an item can be difficult when the shipment information provided by the Enterprise System 105 to the BOSS Server 107 only includes descriptions and/or part numbers. The BOS System is able to rate shipments when there is only a description and/or part number for each item.

FIG. 8 illustrates the architecture for accomplishing rating in such cases. The BOSS Server 107 communicates with attended workstations 125 and unattended workstations 130 for the purposes of rating. Rating may be performed by applications executing without human intervention on either unattended or attended workstations. Alternatively, rating may be performed by an application involving human intervention executing on an attended workstation. A typical embodiment includes at least one attended 125 and one unattended 130 workstation. The attended and unattended workstations rate a shipment based on the importing country's rules; thus, the workstations are adapted to incorporate the rating rules as defined for each country.

Communication between the BOSS Server and workstations is typically accomplished with a LAN 120, which can also be a WAN, Internet, private communication facility, or other type of communication network. In a typical embodiment, the BOSS Server receives and stores shipment information pertaining to and interacts with unattended or attended workstations located throughout the importing country. Typically, the workstations are deployed in the geographic vicinity of the BOSS Server 107 and/or at various carrier business centers. Deployment in a country could involve a few workstations or hundreds of workstations, depending on the size of the country and volume of imported shipments.

At a high level, rating a commodity involves accessing shipping data associated with the same exporter, the same importer, or both. Shipping data containing descriptions and/or part numbers are stored along with the corresponding tariff code that was determined in some manner. The data associated with a given commodity is called a "rating profile." A rating profile may contain the account associated with the exporter, importer, or both; the date the profile was created; the original invoice line description; the original part number; and the source of the profile (how it was created). Each commodity contains a description, tariff code, tariff treatment, tariff classification, procedure identification, preference identification, supplementary codes, excise duties, et cetera. Further information in the rating profile may be included regarding regulatory aspects required for clearance, such as other governmental agency clearances required for importation.

Further, a rating profile may be established for an imported item that is linked to other commodity rating profiles. This is useful when the imported item is an assembly of commodities that is rated according to each sub-component. For example, a rating profile may be established for a particular manufacturer's watch that is identified by a particular watch model number, part number, or descriptive name. This individual rating profile may be associated with several other individual rating profiles. In the example of a wristwatch, the rating profile for the wristwatch may be linked to a rating profile for the wristband, a separate rating profile for the timepiece, and a separate rating profile for the case. Further, if the same watch manufacturer exports a second type of wristwatch, an separate rating profile may exist. This second rating profile may be linked with the same rating profiles for the wristband and the timepiece, but may be linked to a different rating profile for the case. This accommodates assemblies of components where one commodity of the assembly is slightly different, thus impacting the value and associated tariff. This would occur if the wristwatch manufacturer sells wristwatches of different values based on the type of case. (e.g., a steel watch case versus a gold watch case).

Examples of rating profiles are illustrated in FIG. 9a. FIG. 9a illustrates two rating profiles; one for an electronic component 453 and the other an article of clothing 454. While each profile allows indication of a part number 450, not each rating profile is required to indicate a part number. As shown, the rating profile for the article of clothing 454 does not indicates a part number. The description 451 of each rating profile provides a text description of the item while the associated tariff code 452 reflects values previously used to rate the particular commodity by the BOSS system. The rating profile contains other information to facilitate processing, such as defining supplemental rating information that can be used to assist in rating the item.

BOSS provides three methods of rating a shipment: manual, automatic, and assisted. The determination of which method to use is defined by rules programmed into the workstation defining each importing country's rating procedures. Manual rating requires a human operator to define the tariff code for each item without 'assistance' from the BOS System. This may be used when processing shipments in the BOSS system where the BOSS system has not previously processed those commodities for the originator or importer into the country. In this case, there are no previously established corresponding rating profiles in the BOS System.

Automatic and assisted rating procedures process a given commodity by comparing it against an appropriate rating profile. However, it is not always clear which of several possible rating profiles should be selected to rate a given commodity. This is accomplished by the workstation determining a confidence level indicating the relative 'weight' of the match between the description of the commodity as indicated in the shipment data and the description related data in the rating profile for a given commodity. The confidence level, along with locally defined rules, determines whether the tariff code indicated in the rating profile should be used to rate a given commodity. With automatic rating, the workstation processes shipment information without human intervention. If the confidence level of a rating profile for a given commodity exceeds a threshold, then the corresponding tariff code in the rating profile is used. Otherwise, (if the confidence level is at or below a certain level) the workstation may be programmed to handle the shipment in a number of alternative ways. For example, the workstation could relegate those commodities for assisted rating. In assisted rating, the workstation requires human confirmation that the selected rating profile is the proper profile to be used. If so, then the workstation uses the corresponding tariff code in the rating profile. Manual rating does not attempt to match the commodity with a rating profile, but does allow capturing the rating information for indicating which rating profile a commodity should be associated with. Thus, manual rating is typically used when an importer, previously known to the BOS System, imports a new type of commodity. Once manually rated, subsequent rating processes are likely to find a corresponding rating profile for the imported commodity.

Because automatic rating is accomplished without human or manual intervention, it is performed using the unattended workstations 130. Alternatively, an attended workstation 125 can execute the 'unattended' rating process. The workstation executing automatic rating ("auto rating") automatically retrieves new shipment information, retrieves the appropriate rating profiles from the BOS Server, and determines the appropriate rating profile for each commodity. The workstation examines the description and or part numbers for each commodity indicated by the originator and searches the rating profiles to determine what tariff code(s) should apply to the commodity. The workstation retrieves rating profiles previously associated with a specific exporter and/or importer.

For example, an importer of watches may have several suppliers that export the same commodity ("watches"). Each exporter may indicate the commodity using slightly different terms (e.g., wristwatch, watch, pocket-watch). The variations in descriptions may be dictated by the originating country's regulations or national industry practice.

The confidence level determined from searching the rating profiles for a given commodity description or part number is based on various factors, including how the match occurred. For example, the confidence level may be impacted by whether a match against a corresponding rating profile occurred against the part number, the description, or both. The confidence level may be further impacted by whether the importer of a commodity matches the importer of that commodity in the rating profile. For example, a search for a "watch" entry in the rating profile matching a "watch" previously shipped between the same exporter and importer using the same part numbers would generate a high confidence level. In comparison, a match of a "watch" from a different importer using a different part number would likely received a comparatively lower confidence level. Extending the example, if the descriptions were different (e.g., "wristwatch" versus "watch"), a still lower comparative confidence level may be produced. The rating process executing in BOSS may utilize synonyms for the commodity, such as "clock" or "timepiece." Each of these may result in a still lower confidence level.

Each of the criteria is weighted and used to determine the confidence level. Assuming the confidence level is above a threshold and the system is automatically rating the commodity, the system will use the tariff code indicated in the rating profile to rate the shipment. Automatic rating avoids operator intervention in rating the shipment. In assisted (also known as 'advised' rating), the system requires human confirmation of the rating profile used. In manual rating, the system does not search rating profiles, but requires human entry of values. In such cases, the shipment information is placed into a queue for manual processing. An operator then examines each item's description for the purpose of allocating a tariff code(s). The user can then select the appropriate status and tariff code to be associated with the item.

Assisted rating requires human or manual intervention to complete and can be considered a hybrid between manual and automatic rating. In this aspect of the invention, the system is able to 'estimate' or make a 'guess' of the tariff code based on previous shipment data and assign a confidence level to that determination. A threshold is defined for each implementation as to whether the workstation will proceed with rating the shipment or whether the workstation will suspend the processing and request operator invention.

After the tariff codes for all the commodities of a shipment are determined, the system can then rate the shipment. However, if there are other aspects that prevent rating a commodity, the system will suspend the rating process and request further operator input to select the appropriate status of the item.

Establishing Rating Profiles

Rating profiles must be created prior to searching for matching rating profiles. Rating profiles are grouped into sets categorized as either "historical" or "catalog", which reflect, in part, how they were established. Both types of rating profiles sets contain the same information and structure, but differ in part by how many records are maintained in a profile and how they are maintained. The catalog rating profile set is also referred to as a catalog profile or catalog rating profile; similarly, a historical rating profile set is referred to a historical rating profile or historical profile. A catalog rating profile set is statically created while a historical rating profile set is dynamic and can vary over time. For example, a catalog rating profile references a statically defined group of individual commodities rating profiles. Catalog profiles have no limit with respect to the number of commodities associated with an importer. They may be created by literally using a catalog of goods provided by an exporter or used by an importer to manually create a set of related rating profiles. On the other hand, historical profiles are limited in size for a given importer. These may be dynamically adjusted based on frequency of use of items, or by processing recent shipments. Both types of profiles sets can be associated with either an importer or exporter, or both. Further, an individual rating profile may be associated in multiple profile sets. If a catalog or historical rating profile set is associated with both, then system preferable does not allow the profile set to be deleted until both relationships are broken.

For example, an individual rating profile for an importer of watches may also be associated with an Exporter "A" of watch parts. Assume the rating profile is also associated with both the importer of the watch parts. If Exporter "A" goes out of business and the importer obtains components from Exporter "B", the same rating profile continues to be associated with the importer, but it is no longer associated with Exporter "A". The rating profile will be updated at some point to reflect an association with Exporter "B".

A catalog profile can be established manually or by converting a historical profile. An illustration of a BOS System workstation window used by an administrator to create a catalog profile is illustrated in FIG. 9b. In this case, the window 600 is presented to the user and contains information related to the information associated with importer, tariff, and rating information. The importer 602 is defined using a numerical code, which can be used by the system when searching for rating profiles associated with a specific importer. Fields are presented for both the particular part number 604 and description 606 of the particular commodity. Another section of the window 600 contains descriptive information 610 associated with both the international tariff harmonization scheme and defined tariff code 612. A user at the attended workstation can edit the rating profile, as well as provide supplemental information, prior to saving the rating profile in the target catalog profile. There are additional fields associated with the rating profile including fields indicating supplemental codes 613, specific excise duties 614, and other codes to indicate treatment during rating or are recognized and used by customs officials. The foregoing example illustrates the principles of the present invention with respect to creating a catalog rating profile.

The other type of profile is the historical rating profile set, which is of a fixed length, and captures commodity descriptions along with their tariff codes based on previous shipments to create individual rating profiles and add them to the rating profile set. The historical rating profile is linked by both the exporter and importer such that the historical profile can be applied for subsequent shipments to either the importer or exporter, or both. For example, an importer of watches may have several suppliers exporting assembled watches. Once the historical profile is created based on an initial shipment from a given exporter, the rating profile is available for rating subsequent shipments to the importer, regardless of the exporter. This is based on the presumption that goods shipped to an importer using a common description are likely to be the same type of goods. Specifically, a 'watchband' imported by a manufacturer from various exporters is likely to be the same commodity, regardless of the exporter.

Historical profiles are based on previously rated shipments and can be modeled as a queue with limited storage. When rating a commodity, the workstation may determine the rating profile is already in the historical profile and there determine there is no need to add it to the historical rating profile set. If an individual rating profile not already present in the historical rating profile set, the BOS System may append a new rating profile to the historical profile set or BOSS may otherwise update an existing individual rating profile. The BOSS Server typically periodically processes a customer's historical profile to limit the size of the historical profile by dropping off typically the oldest and least used profiles. Over time, certain items may no longer be maintained in the historical rating profile. This provides one motivation for converting historical profiles to catalog profiles since catalog profiles are 'static' and do not change over time. Further, catalog profiles are of unlimited size with respect to the number of commodities that can be maintained.

Alternatively, a catalog rating profile can be created absent any historical profiles existing. This allows users of the BOSS in a given country to establish a rating profile for a new importer before any shipments are processed. This can also be used when it is known that new commodity codes are scheduled to be added or changed.

If the workstation does attempt to rate a commodity and finds there is no rating profile, rules can be defined so that the system requests user assistance to rate the commodity. Once user intervention has defined a "watch" to correspond to three different commodity types and corresponding tariff codes, this information can be used to update either historical rating profile, the catalog rating profile, or both. Thus, subsequent processing of shipments will recognize a "watch" commodity in a rating profile and rate it in a consistent manner regardless of whether a historical or catalog profile is used to rate a shipment.

During the rating process, the workstation acts as a client to the BOSS Server by requesting various Data Services Objects. As previously indicated, the BOSS Server implements Data Services objects that function to process client requests to accomplish rating and other functions. The Data Services were previously identified in Table 2 and define several groups that are used for building rating profiles. For example, the Shipment Services category allows, in part, a workstation (client) to read/write shipment information to/from the BOSS Server. Tariff and exchanges rates can be obtained by the workstation from the BOSS Server and catalog profiles can be built. The Customer Services capabilities allow customer information and rating profiles to be read and written by the workstation. The Movement Services allow waybill information to be obtained and updated. The Security and the Utility Services are more administrative in nature and are not directly used in rating shipments.

Example

The rating process operates in accordance with locally programmed rules. The flexibility of the rating process is illustrated in an exemplary rating process shown in FIGS. 10*a* and 10*b*. Rating begins 460 when a workstation retrieves shipment information 461 from the BOSS Server. The workstation uses rules for processing shipping information in the desired manner. In this illustration, the workstation defaults to processing the shipment automatically 462. In certain cases, the user could override this by invoking assisted rating 463. Once automatic rating is started, the workstation begins by reading the initial commodity on the shipment list 464. Based on the part number and/or description, the commodity is compared to the rating profiles 465. When the best match is determined, a confidence level is calculated. Other factors impacting the confidence level are the matching of other fields, including whether the importer or exporter fields match the consignee or shipper. Once the commodity has been rated, the workstation determines and records the confidence level of the commodity 466. Although not shown, the workstation may record other related information from the rating profile, such as other procedures unique for rating the commodity. If there are any more commodities to be searched 467, the process is repeated. If all records in the shipment are processed, the system will then examine the lowest confidence level for a commodity in the shipment 468. Essentially, the lowest confidence of any commodity in the shipment determines the confidence level of the entire shipment. If the lowest confidence level is above a first predefined threshold, then shipment is accepted 469 and auto rating is completed 473. If the threshold is below the first threshold, but above a second threshold, the system will revert to assisted rating and request the user (also known as the "rater") to manually review the rating performed by the system 470 and request approval for each item's rating. After confirmation is completed, the rating is completed 473. If the confidence level is below the second threshold, the system will rate the shipment using the manual rating procedures. 471. This process is illustrated in FIG. 10*b* starting with the entry point 463.

In FIG. 10*b*, the assisted rating procedure starts with retrieving a commodity from the shipment list 473. The system will search and retrieve the rating profiles, typically more than one, and present them to the user 474. The presentation order is based on a weighting of the rating profile match from most-likely-to-match to least-likely-to-match. Locally programmed rules define the criteria used to determine a match, the relative weights to assign to each criteria, and how information is presented. The values and weights used in assisted rating may be different than the values used in automatic rating. The contents of the rating profile are presented to the user, who then manually compares the rating profile with the shipment's commodity information to determine whether there is an appropriate rating profile to select 475. If there is, the user selects that rating profile for the system to use in rating the commodity 476. If none of the rating profiles are acceptable, the user will likely edit the search parameters 477 and/or retrieve other rating profiles 475 until an appropriate profile is found. Once selected, that rating profile is used to rate the commodity with the selected tariff code.

The rating process is defined locally using rules and scripts programmed in the attended or unattended workstations. A rating process requiring user intervention operates using the attended workstations. The automatic rating processes are usually processed on unattended workstations, but the same application can be executed on attended workstations (but without user interaction). In the previous example, the rating process could have been defined so that only assisted rating occurs.

The rating process also allows using different weighting levels and confidence thresholds for automatic versus assisted rating. Automatic rating can occur by operating on all commodities in a Declaration, or, as described above, on a per-commodity basis. Alternatively, the rules and processing scripts can specify use of either catalog or historical rating profiles when comparing the commodities in the shipment. The rating process is adaptable by system programmers in each country regarding how shipments are rated.

Client Architecture

The rating and customs clearance processing occurs in the workstations and the BOSS Server functions as a database repository and coordinates communication with other systems, namely the Enterprise System and Local Operational Scanning Systems. The functions of the BOSS Server are largely separate from the rating process and customs clearance. However the workstation does execute the rating process and customs clearance procedures; hence the workstation is 'customized' for a given country. The workstation software architecture functions as a client to the BOS Server. This is based on the well-known client-server architecture in the area of computer communications that is often used to enable a remote computer to access data from another. The workstation is defined to accommodate each country's rules for rating a package as well as interfacing with each country's customs officials. The BOS System preferably maintains a library of over 1000 rules implemented via programming objects that are selected and programmed to achieve the desired local brokerage functions. This provides an architecture designed to provide flexibility to accommodate installations in any given country.

The workstation software architecture is illustrated in FIG. 11 and comprises five main software modules or components that facilitate customization. The workstation 500 contains a Data Services component 540, a Business Logic component 530, an Automation component 520, a Rules component 555, and a User Interface component 510. The first four components form the business logic for the system, while the User Interface 510 interacts provides the human-user interface and the main application of rating shipments and update customer accounts. Each of these modules is discussed individually below.

The Data Services component 540 facilitates communication with the BOSS Server 107 (not shown in FIG. 11). The Data Service layer isolates the other components of the workstation from the specific database structure and procedures associated with BOSS Server interaction. The Data Service component is 'platform dependant', i.e., it reflects the particular platform used to implement the BOSS Server, which is a minicomputer, such as an IBM AS/400 computer. However, the Data Service component allows the other components in the workstation to be platform independent.

The Data Services layer allows searching, retrieval, and storing of shipment, rating, and customer related information from the server using the Data Services. These were previously identified when discussing the software architecture of the BOSS Server, and examples include retrieving rating profiles from the BOS Server. The Data Services component 540 reflects the specific protocol layers, messages, and procedures required to convey information between the BOSS Server and the workstation. Further, the Data Services component 540 contains all of the reference data used by the system to allow the other components (namely the User Interface and Business Layer) to use the same reference data for validation with the BOSS Server.

The Data Services component 540 exchanges information with the Business Logic component, thereby allowing the Business Logic component to be unaware of the communication protocol details involved in communicating with the BOSS Server. A corresponding component in the BOSS Server provides and receives shipment information and manages access to the shipment data from the various workstations.

The Business Logic component 530 contains the fundamental business information related to shipment information. The Business Logic layer is comprised of closely related programming objects representing various shipping related data. These groups are also called 'packages' and relate to common shipping concepts, regardless of the importing country. The client architecture uses object oriented programming to manipulate uniquely identified objects with defined attributes and data types. The objects may be used to return a specific property or a collection of properties related to a shipment. These objects are used to define and manipulate information regarding a shipment, package, invoice, Declaration, and customer. Other objects provide additional information related to the key objects.

One key business object is the shipment object. The shipment object often contains a collection of package objects. Each package object, in turn, is associated with reference number objects used by the carrier in processing the package. The shipment object contains flags that indicate the shipment can be transferred to the BOSS Server. Another object related to the shipment object is the shipment status object indicating whether the shipment is cleared (available for delivery) or held (not available). The package objects include information pertaining to the associated packages and package reference identifiers.

The invoice object contains information describing the commodities being shipped and much of the description of the commodities are provided by the entity originating the shipment of goods. The description of goods is used to formulate a declaration object representing a single customs document containing tariff codes corresponding to the commodity goods shipped. The tariff codes are used to rate the commodity. The declaration object also contains the reference numbers of the packages that correspond to the shipment, including identifiers used by various systems and entities. For example, one identifier associated with the shipment will be a number allocated by the Customs Office. Another identifier associated with the shipment may be a number given to the originator by the carrier. Still other numbers may be identifiers provided by intermediate carriers.

Finally, a customer object defines the recipient of the shipment, who may or may not be the importer of the shipment. The importer is the entity typically responsible for receiving the shipment from the carrier. There are various other objects representing ancillary information pertaining to a shipment, including rating objects, brokerage status objects, and brokerage events objects.

In many cases, object may be used to create other objects. For example, each country requires a Declaration, which is a document used to obtain customs clearance. Each country may have variations in the contents and structure of the Declaration. Typically, all Declarations include basic information such as weight of the item shipped, consignee address, carrier delivering the item, et cetera. This basic information can be used in other shipping related applications. The Declaration includes the originator's name, which may be defined in the customer name object. The customer name object may be used to identify the customer for other purposes, such as billing. The business logic packages objects into six main logical groupings as shown in Table 4.

TABLE 4

| Package Name | Objects Represented |
|---|---|
| Charges | Charges paid by the Customer and/or the Carrier. These charges include fees, often paid by the Carrier on behalf of the Customer, for importing international shipments and include duties, taxes, customs fees, and carrier related assessments. |

TABLE 4-continued

| Package Name | Objects Represented |
|---|---|
| Customer | Information related to the Customer and/or their account with the Carrier for international shipments. |
| Declaration | Information contained in the Declaration, a document associated with describing the international shipment. This package duplicates information obtained from other packages so that is can be manipulated for importation without impacting the source objects. |
| Invoice | Commercial Invoice provided for the Shipment of Goods. Although similar to the Declaration, the Commercial Invoice is not used as the basis for customer clearance determination. |
| Tariff | Information classifying commodities and used by Customs. This information includes descriptions and charge rates used on specific goods being imported. |

In addition, there are administrative objects defined to control other objects, including selection of data and non-business data (e.g., system measurements).

Automation and Rules Components

The next software component in the workstation is the Automation component 520, also known as the "BOSS Core" as it defines a major aspect of the system's operation. The Automation component allows customization of the system for operation in a specific country and all workstations (whether attended or unattended) maintain the same version of the Automation component. Software developers in each importing country customize the BOS System by defining scripts in the Automation component. The Automation component in turn manipulates a Rules component. Customization of the BOSS operation may be accomplished by defining various scripts, by defining additional rules, or by the combination of the two. Thus, procedures for determining how to rate a shipment (e.g., manual, automatic, or assisted) in a given implementation are defined by the Automation component processing a shipment using the Rules components. Consequently, these two components are discussed together.

The Automation component uses and applies the rules as defined in the Rules component 555. Numerous rules defined in a library are available for use by local programmers to define how rating occurs as well as handling related procedures. The Rules component is similar to a library of rules and is available to the local developers to select the appropriate rules to process shipments into a specific country. Frequently, a small number of rules (e.g., sixty) are used to define how to process shipments for a given country, but because the Rules component is intended to accommodate any country, a library of over one thousand rules exists. Should functionality be required that is not defined in a rule in the library, new rules can be added by local developers. However, the scope of the library is such that new rules are not likely required.

There are two major types of Rules. Implicit Rules provide a set of functions for manipulating and accessing data before and after changes to the data are made. This provides a rich set of functions to react to when a user interacts with the system. Explicit Rules respond to business events that occur, but cannot be tied to any one specific data element change. Table 5 illustrates the five main groupings of the explicit rules.

TABLE 5

| Explicit Rule Category | Rules Function |
|---|---|
| Pre-Processing | Prepares a newly downloaded Shipment for brokerage processing. |
| Charge Calculation | Interprets the shipment and classification; generates and calculates charges. |
| Storage | Validates and automates changes when a Shipment Store is requested. |
| Auto Rating | Retrieves, evaluates, and applies classifications based on either catalog or historical information. |
| Custom | Allows a user to request functions only available within the given country via use of flexible rule entry points. |

Other objects in the Automation component allow automated updates to Shipments. These objects perform functions associated with mass updates, shipment forecasts, shipment scanning, and target search requests. These objects also execute the various rules used to accomplish these tasks.

User Interface

The last main software component is the User Interface 510. This software component interacts with the Automation Layer and the user (located at the attended workstations). The User Interface is an example of a 'driver', which is an application using the Automation Layer. Other driver applications may be defined and executed locally, such as the System Administrator (discussed below) that can operate on the unattended workstations.

The User Interface is organized into components based on screens presented to the user. There is a standard set of screens that are the basis for development of each country's implementation. These include standard selection screens providing a flexible, but consistent method of Shipment and Customs data selection. These screens are dynamically registered so that they can be changed rapidly without having to compile different base systems for each country. Another set of screens represents a logical grouping based on geographic regions. Examples include a common form of data entry, such as the European Simplified Administrative Document (SAD) or U.S. 7501 Entry Presentation formats. Other components are common routines that are used with the visual components, such as common methods for displaying data in a style and format common to all deployments.

Finally, a translation component in the User Interface facilitates language translation screens for different languages. This is accomplished by tagging each label and defining groups of labels. Each group is then associated with a language and allows the BOSS to translate label groups for different languages as required. This allows a developer in a country to customize label names on user screens without having to deploy additional translation software.

In addition to the above components, other applications are provided. These include 'driver' applications that interact with the Automation and other layers in a method similar to the User Interface component. The alternative applications can be viewed as a replacement, sub-component, or augmentation of the User Interface component. One main application is the System Agent. The System Agent automates the operation of shipment processing for unattended workstations. It can also execute on an attended workstation, but display capabilities are not required. The Administration application is another function that can be substituted for the main interface providing a user various administrative functions, including monitoring errors generated by unattended workstations; monitoring processing of other workstations; maintaining local reference data; viewing shipment data; and administering user settings. Shipment Repair is another application that is essentially a special purpose Main Interface with limited capabilities.

Example

The overall operation of the BOS System is illustrated using FIG. 2 to describe interactions typically occurring in processing a shipment from an originating (exporting) country to the destination (importing) country. Because the BOS System is a platform that is customized for use in each country, the procedures are one embodiment of application of the system. For sake of illustration, assume a shipment comprises a single package originating from England, destined for Denmark, using a single carrier. It is assumed the BOS System is deployed in Denmark and all the Enterprise System interacts with the BOS System are located in the United States.

The shipper prepares the shipment and provides all the appropriate shipping information to the carrier when handing over the shipment to the carrier in England. A variety of systems known to those skilled in the art can be used to obtain and store the shipment information as well as correlate the shipment with such information, including the attachment of a bar code to the shipment for optical scanning. The information captured in England is conveyed to the Enterprise System(s) located in the U.S.

The Enterprise System examines the information and determines the appropriate shipment information that should be sent to the BOSS Server in Denmark. The BOSS Server receives and stored the shipment data. This functionality occurs autonomously using the architectural services in the server.

The BOS System in Denmark rates shipments by using the previously described rating example. An automatic rating application running on an attended workstation obtains the shipping information from the BOSS Server and attempts to rate the commodities listed. This application involves the User Interface Component interacting with the Automation Script by invoking selected rules to rate the commodities. In this example, if a threshold level is not met, the system may default to assisted rating and use a catalog rating profile to compare the description and/or part number against previously defined rating profiles. After the user confirms or corrects all entries, the shipment is updated with all of the corresponding tariff codes. The workstation then rates the shipment and communicates the rating information to the BOSS Server. The BOSS Server updates its database and relays the rating information to the Enterprise System in the U.S., which may, in turn, trigger invoice processing.

Meanwhile, the shipment is being transported en route from England to Denmark. The shipment is scanned when exported from England. The scan location information is captured by the carrier's infrastructure in England and communicated to the Enterprise System in the U.S. The Enterprise System, in turn, provides a copy of the location indication to the BOSS Server in Denmark. Once the Enterprise System communicates the scan information to the BOS System in Denmark, the BOS System knows the shipment is en route. Using locally defined rules, the BOS System, specifically a workstation, initiates an interaction with the Danish Customs Office, preferably using an electronic interface to request customs clearance. At this point, the appropriate duties, fees, and tariff codes have been determined. The interaction involves requesting customs clearance for the indicated shipment with the expected arrival date. Assuming the Danish Customs system then approves the clearance, the BOSS Server stores this information and notifies the Enterprise System in the U.S. as well as the scanning systems handing the incoming international shipments into Denmark. When the shipment arrives at Denmark's port of entry, the shipment is scanned. There, the Local Operations Scanning System identifies the shipment and determines whether Customs clearance has been obtained. Since customs clearance has been obtained, LOSS indicates the shipment can be processed to the final destination. The BOSS Server is updated regarding the scanning information, so that the BOSS Server knows that shipment is proceeding for final delivery.

In this manner, the BOS System provides a locally customized system for receiving international shipment information, rating the shipment, coordinating clearance of the shipment with the government customs office, and coordinating shipment handling systems at the port of entry via local scanning systems so that only cleared shipments are released for delivery. The BOS System stores and coordinates the information with the Enterprise System to facilitate billing, timely updates of status information, and coordination of custom's clearance status.

Although particular illustrative embodiments have been disclosed, persons skilled in the art will appreciate that the present invention can be practiced by other than the disclosed embodiments, which are presented for purposes of illustration, and not of limitation, and that the present invention is limited only by the claims that follow.

Many modifications and other embodiments of the inventions set forth herein will come to mind to one skilled in the art to which these inventions pertain having the benefit of the teachings presented in the foregoing descriptions and associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A system for rating a shipment comprising:
 a database for storing shipment data comprising a description of one good in the shipment, a shipper of the good, and an importer of the good,
 the database storing a plurality of rating profiles, each rating profile comprising a description of an item, a shipper of the item, an importer of the item, and a tariff code associated with the item; and
 a processor configured to:
  access the database;
  compare the description of the good with the description of the item for each of the plurality of rating profiles;
  select a first rating profile from the plurality of rating profiles based at least in part on a comparison between the description of the good with the description of the item from the first rating profile;
  determine a confidence level associated with the first rating profile based at least in part on a comparison between: (1) the description of the good and the description of the item from the first rating profile, (2) the shipper of the good and the shipper of the item from the first rating profile, and (3) the importer of the good and the importer of the item from the first rating profile, wherein the confidence level is based at least in part on a number of matches between: (1) the description of the good and the description of the item, (2) the shipper of the good and the shipper of the item, and (3) the importer of the good and the importer of the item and what was matched between: (1) the description of the good and the description of the item, (2) the shipper of the good and the shipper of the item, and (3) the importer of the good and the importer of the item;

in response to the confidence level exceeding a predetermined threshold value,
calculate a tariff amount associated with the good based in part on the tariff code associated with the item; and
update the shipment data in the database to include the tariff amount.

2. The system of claim 1 wherein the processor is further configured to receive user input to select the first rating profile if the confidence level is less than the predetermined threshold value.

3. The system of claim 1 wherein the processor is further configured to record in the shipment data the tariff code associated with the selected first rating profile.

4. The system of claim 1 wherein the tariff amount is calculated using a tariff rate associated with the tariff code.

* * * * *